US011231319B1

(12) United States Patent
Tu et al.

(10) Patent No.: US 11,231,319 B1
(45) Date of Patent: Jan. 25, 2022

(54) ATHERMAL WAVELENGTH STABILITY MONITOR USING A DETRACTION GRATING

(71) Applicant: Apple Inc., Cupertino, CA (US)

(72) Inventors: Yongming Tu, Redwood City, CA (US); Alfredo Bismuto, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/014,015

(22) Filed: Sep. 8, 2020

Related U.S. Application Data

(60) Provisional application No. 62/897,771, filed on Sep. 9, 2019.

(51) Int. Cl.
*G01J 3/28* (2006.01)
*G01J 3/18* (2006.01)
(Continued)

(52) U.S. Cl.
CPC ............... *G01J 3/18* (2013.01); *G01J 3/0205* (2013.01); *G01J 3/027* (2013.01); *G01J 3/28* (2013.01);
(Continued)

(58) Field of Classification Search
CPC ...... G01J 3/18; G01J 3/027; G01J 3/28; G01J 3/02; G01J 3/26; G01J 3/0205; G02B 5/1861; G02B 6/4204; H05B 47/105
See application file for complete search history.

(56) References Cited

U.S. PATENT DOCUMENTS 5,287,376 A 2/1994 Paoli
5,488,678 A 1/1996 Taneya
(Continued)

FOREIGN PATENT DOCUMENTS

CN 104614084 5/2015
EP 1403985 3/2004
(Continued)

OTHER PUBLICATIONS

Gonzalez-Sanchez et al., "Capacitive Sensing for Non-Invasive Breathing and Heart Monitoring in Non-Restrained, Non-Sedated Laboratory Mice," Sensors 2016, vol. 16, No. 1052, pp. 1-16.
(Continued)

*Primary Examiner* — Abdullahi Nur
(74) *Attorney, Agent, or Firm* — Brownstein Hyatt Farber Schreck, LLP

(57) ABSTRACT

Configurations for a diffraction grating design that mitigates thermal wavelength shifts and corresponding methods thereof are disclosed. The wavelength stability monitoring system may include a planar waveguide that receives input light directed toward a diffraction grating. The diffraction grating may reflect the light back through the planar waveguide and to one or more detectors. The planar waveguide may include multiple materials, such as a first material and a second athermal material that is adjacent to the first material. The athermal material may mitigate thermal wavelength shifts of the light. The design of the athermal material may include targeting a ratio of the input and output path lengths across sets of input and output angles of light that pass through the first material and the second athermal material. In some examples, the output waveguides may be positioned to receive leakage modes of light.

20 Claims, 13 Drawing Sheets

(51) Int. Cl.
*G02B 5/18* (2006.01)
*H05B 47/105* (2020.01)
*G01J 3/02* (2006.01)
*G02B 6/42* (2006.01)

(52) U.S. Cl.
CPC ......... *G02B 5/1861* (2013.01); *G02B 6/4204* (2013.01); *H05B 47/105* (2020.01)

(56) References Cited

U.S. PATENT DOCUMENTS

| | | |
|---|---|---|
| 5,644,667 A | 7/1997 | Tabuchi |
| 5,708,674 A | 1/1998 | Berrnink |
| 5,742,631 A | 4/1998 | Paoli |
| 5,850,411 A | 12/1998 | Major, Jr. |
| 5,915,165 A | 6/1999 | Sun |
| 6,122,042 A | 9/2000 | Wunderman et al. |
| 6,330,378 B1 | 12/2001 | Forrest |
| 6,393,185 B1 | 5/2002 | Deacon |
| 6,465,929 B1 | 10/2002 | Levitan et al. |
| 6,519,382 B1 | 2/2003 | Jurbergs |
| 6,594,409 B2 | 7/2003 | Dutt et al. |
| 6,628,686 B1 | 9/2003 | Sargent |
| 6,628,858 B2 | 9/2003 | Zhang |
| 6,657,723 B2 | 12/2003 | Cohen |
| 6,795,622 B2 | 9/2004 | Forrest |
| 6,801,679 B2 | 10/2004 | Koh |
| 6,801,683 B2 | 10/2004 | Kanie et al. |
| 6,803,604 B2 | 10/2004 | Takahashi et al. |
| 6,823,098 B2 | 11/2004 | Guidotti et al. |
| 6,892,449 B1 | 5/2005 | Brophy et al. |
| 6,904,191 B2 | 6/2005 | Kubby |
| 6,940,182 B2 | 9/2005 | Hilton et al. |
| 6,947,639 B2 | 9/2005 | Singh |
| 6,952,504 B2 | 10/2005 | Bi |
| 6,987,906 B2 | 1/2006 | Nakama et al. |
| 7,054,517 B2 | 5/2006 | Mossberg |
| 7,058,245 B2 | 6/2006 | Farahi |
| 7,079,715 B2 | 7/2006 | Kish |
| 7,085,445 B2 | 8/2006 | Koh |
| 7,189,011 B2 | 3/2007 | Harker |
| 7,203,401 B2 | 4/2007 | Mossberg |
| 7,203,426 B2 | 4/2007 | Wu et al. |
| 7,209,611 B2 | 4/2007 | Joyner |
| 7,245,379 B2 | 7/2007 | Schwabe |
| 7,283,694 B2 | 10/2007 | Welch |
| 7,314,451 B2 | 1/2008 | Halperin et al. |
| 7,324,195 B2 | 1/2008 | Packirisamy et al. |
| 7,366,364 B2 | 4/2008 | Singh |
| 7,447,393 B2 | 11/2008 | Yan |
| 7,460,742 B2 | 12/2008 | Joyner |
| 7,477,384 B2 | 1/2009 | Schwabe |
| 7,483,599 B2 | 1/2009 | Dominic et al. |
| 7,526,007 B2 | 4/2009 | Chua et al. |
| 7,558,301 B2 | 7/2009 | Lin et al. |
| 7,680,364 B2 | 3/2010 | Nilsson |
| 7,720,328 B2 | 5/2010 | Yan |
| 7,885,302 B2 | 2/2011 | Eberhard |
| 7,885,492 B2 | 2/2011 | Welch |
| 7,974,504 B2 | 7/2011 | Nagarajan |
| 8,300,994 B2 | 10/2012 | Welch et al. |
| 8,559,775 B2 | 10/2013 | Babie et al. |
| 8,564,784 B2 | 10/2013 | Wang et al. |
| 8,724,100 B1 | 5/2014 | Asghari et al. |
| 8,920,332 B2 | 12/2014 | Hong et al. |
| 8,983,250 B2 | 3/2015 | Black et al. |
| 9,020,004 B2 | 4/2015 | Jeong |
| 9,031,412 B2 | 5/2015 | Nagarajan |
| 9,110,259 B1 | 8/2015 | Black |
| 9,135,397 B2 | 9/2015 | Denyer et al. |
| 9,176,282 B2 | 11/2015 | Pottier |
| 9,217,669 B2 | 12/2015 | Wu et al. |
| 9,348,154 B2 | 5/2016 | Hayakawa |
| 9,370,689 B2 | 6/2016 | Guillama et al. |
| 9,405,066 B2 | 8/2016 | Mahgerefteh |
| 9,543,736 B1 | 1/2017 | Barwicz et al. |
| 9,620,931 B2 | 4/2017 | Tanaka |
| 9,643,181 B1 | 5/2017 | Chang |
| 9,766,370 B2 | 9/2017 | Aloe et al. |
| 9,804,027 B2 | 10/2017 | Fish et al. |
| 9,829,631 B2 | 11/2017 | Lambert |
| 9,880,352 B2 | 1/2018 | Florjanczyk |
| 9,943,237 B2 | 4/2018 | Baker et al. |
| 9,948,063 B2 | 4/2018 | Caneau et al. |
| 10,009,668 B2 | 6/2018 | Liboiron-Ladouceur |
| 10,046,229 B2 | 8/2018 | Tran et al. |
| 10,132,996 B2 | 11/2018 | Lambert |
| 10,203,762 B2 | 2/2019 | Bradski et al. |
| 10,238,351 B2 | 3/2019 | Halperin et al. |
| 10,285,898 B2 | 5/2019 | Douglas et al. |
| 10,310,196 B2 | 6/2019 | Hutchison |
| 10,429,597 B2 | 10/2019 | ten Have et al. |
| 10,529,003 B2 | 1/2020 | Mazed |
| 10,687,718 B2 | 6/2020 | Allec et al. |
| 10,852,492 B1 | 12/2020 | Vermeulen et al. |
| 11,064,592 B1 | 7/2021 | Bismuto et al. |
| 2004/0126117 A1 | 7/2004 | Lo et al. |
| 2005/0053112 A1 | 3/2005 | Shams-Zadeh-Amiri |
| 2005/0063431 A1 | 3/2005 | Gallup et al. |
| 2005/0151966 A1* | 7/2005 | Packirisamy ......... B82Y 20/00 356/328 |
| 2006/0002443 A1 | 1/2006 | Farber et al. |
| 2008/0044128 A1 | 2/2008 | Kish et al. |
| 2008/0310470 A1 | 12/2008 | Ooi et al. |
| 2014/0029943 A1 | 1/2014 | Mathai et al. |
| 2016/0224750 A1 | 8/2016 | Kethman et al. |
| 2017/0164878 A1 | 6/2017 | Connor |
| 2018/0241174 A1 | 8/2018 | Weber |
| 2019/0339468 A1 | 11/2019 | Evans |
| 2019/0342009 A1 | 11/2019 | Evans |
| 2020/0152615 A1 | 5/2020 | Krasulick et al. |
| 2020/0244045 A1 | 7/2020 | Bismuto et al. |
| 2020/0253547 A1 | 8/2020 | Harris et al. |
| 2020/0309593 A1 | 10/2020 | Bismuto et al. |
| 2021/0033805 A1 | 2/2021 | Bishop et al. |
| 2021/0199576 A1 | 7/2021 | Arbore et al. |

FOREIGN PATENT DOCUMENTS

| | | |
|---|---|---|
| EP | 1432045 | 6/2004 |
| JP | 2008262118 | 10/2008 |
| WO | WO 01/014929 | 3/2001 |
| WO | WO 04/031824 | 4/2004 |
| WO | WO 05/091036 | 9/2005 |
| WO | WO 11/090274 | 7/2011 |
| WO | WO 17/040431 | 3/2017 |
| WO | WO 17/184420 | 10/2017 |
| WO | WO 17/184423 | 10/2017 |
| WO | WO 20/106974 | 5/2020 |

OTHER PUBLICATIONS

Kybartas et al., "Capacitive Sensor for Respiratory Monitoring," Conference "Biomedical Engineering," Nov. 2015, 6 pages.
Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.
Materials and Processes for Electronic Applications, Series Editor: James J. Licari, AvanTeco, Whittier, California, Elsevier Inc., 2009, 20 pages.
Worhoff et al., "Flip-chip assembly for photonic circuits," MESA+ Research Institute, University of Twente, Integrated Optical MicroSystems Group, The Netherlands, 12 pages.
U.S. Appl. No. 16/650,804, filed Mar. 25, 2020, Arbore et al.
U.S. Appl. No. 17/254,810, filed Dec. 21, 2020, Bishop et al.
He et al., "Integrated Polarization Compensator for WDM Waveguide Demultiplexers," IEEE Photonics Technology Letters vol. 11, No. 2, Feb. 1999, pp. 224-226.
U.S. Appl. No. 17/373,167, filed Jul. 12, 2021, Bismuto et al.
U.S. Appl. No. 17/379,759, filed Jul. 19, 2021, Lee et al.

(56) References Cited

OTHER PUBLICATIONS

U.S. Appl. No. 17/386,297, filed Jul. 27, 2021, Tu et al.
U.S. Appl. No. 17/386,362, filed Jul. 27, 2021, Tu et al.
U.S. Appl. No. 17/407,016, filed Aug. 19, 2021, Hill et al.
U.S. Appl. No. 17/408,122, filed Aug. 20, 2021, Wu.
Bogaerts, et al., "Off-Chip Coupling," Handbook of Silicon Photonics, CRC Press, Apr. 2013, 43 pages.
Chang et al., "A Comb-Drive Actuator Driven by Capacitively-Coupled-Power," *Sensors*, 2012, pp. 10881-10889.
Holmström et al., "MEMS Laser Scanners: A Review," Journal of Microelectromechanical Systems, vol. 23, No. 2, 2014, pp. 259-275.
Milanovic et al., "Compact MEMS Mirror Based Q-Switch Module for Pulse-on-demand Laser Range Finders," presented at SPIE Conference on MOEMS and Miniaturized Systems XIV, San Francisco, California, 2015, 7 pages.
Schiappelli et al., "Efficient fiber-to-waveguide coupling by a lense on the end of the optical fiber fabricated by focused ion beam milling," *Microelectronic Engineering*, 73-74, 2004, pp. 397-404.
Tsai et al., "A Laminate Cantilever Waveguide Optical Switch," 2012, downloaded Sep. 19, 2021 from IEEE Xplore, pp. 203-207.

\* cited by examiner

ATHERMAL WAVELENGTH STABILITY MONITOR USING A DETRACTION GRATING

CROSS-REFERENCE TO RELATED APPLICATION

This application is a nonprovisional of and claims the benefit under 35 U.S.C. § 119(e) of U.S. Provisional Patent Application No. 62/897,771, filed Sep. 9, 2019, and entitled "Athermal Diffraction Grating-Based Wavelength Stability Monitor," the contents of which are incorporated herein by reference as if fully disclosed herein.

FIELD

This disclosure relates generally to an optical system for wavelength monitoring. More particularly, embodiments herein relate to an optical system for monitoring a wavelength system using an athermal diffraction grating.

BACKGROUND

Optical sensing systems with diffraction gratings may be used for different applications and/or in various optical instruments, such as monochromators, lasers, holographic memory systems, wavelength division multiplexing (WDM) systems, and high-resolution spectrometers. In some examples, it may be useful to monitor and/or measure different optical properties of light emitted by light sources of the optical sensing systems. For example, the optical properties of emitted light can be monitored to ensure that a light source is tuned to a target wavelength and/or has a certain amount of wavelength stability.

In some examples, the optical sensing system can include a set of light sources and various optical components. The light emitted by the set of light sources may vary with temperature variations. The temperature variations may not only cause the light emitted to vary in wavelength, but may also cause other variations in the optical sensing system which may affect the ability to monitor the quality of the light emitted by the set of light sources.

SUMMARY

Embodiments of the systems, devices, methods, and apparatuses described in the present disclosure are directed to an athermal device for monitoring light. Also described are systems, devices, methods, and apparatuses directed to monitoring light with a wavelength monitoring device that includes a planar waveguide that includes crystalline silicon and an athermal material. The input light and output light, including the corresponding sets of input and output angles of light, may propagate along input light paths and output light paths in the planar material. The ratio of the input and output light paths that pass through the crystalline silicon and the athermal material may be consistent across all sets of input and output angles of light.

In some examples, the present disclosure describes a wavelength stability monitoring system. The wavelength stability monitoring system may include a set of light sources configured to emit light, a wavelength stability monitor, and a controller. The wavelength stability monitor may include a planar waveguide that may include a first material and a second athermal material different from the first material. The second athermal material may also be located adjacent to the first material and located to receive light from the set of light sources. the wavelength stability monitor may also include a diffraction grating configured to receive light from the planar waveguide and one or more detectors that receive light from the diffraction grating and generate one or more detector signals indicative of the received light. The controller may be configured to provide a control signal to the set of light sources, receive the one or more detector signals from the one or more detectors, determine a monitored wavelength based at least in part on the one or more detector signals, determine a difference between the monitored wavelength and a targeted wavelength, and adjust the control signals based on the determined difference. In some examples, the wavelength stability monitor may include an input waveguide configured to direct light to the planar waveguide and a set of output waveguides configured to receive light from the planar waveguide. In some examples, the input waveguide and the output waveguide may be strip waveguides. In some examples a first side of the second athermal material may be defined by a light path or input light propagating from the input waveguide toward the diffraction grating, a second side of the second athermal material may be defined by a light path or reflected light propagating from the diffraction grating toward the set of output strip waveguides, and the first material may abut the first side and second side of the second athermal material. In some examples, the second athermal material may not be located between the diffraction grating and the one or more detectors.

In some examples, the first material may be located between the diffraction grating and at least one of the one or more detectors and the second athermal material may be located adjacent to the first material and between the diffraction grating and the at least one of the one or more detectors. In some examples, the planar waveguide may include a third material located adjacent to the second athermal material and the first material and the third material may be the same material. In some examples, the second region of the second athermal material may be located between the first region and the third region of the first material. In still further examples, the first material may be crystalline silicon and the second athermal material may be amorphous silicon.

In some examples, the present disclosure describes an optical device. The optical device may include a planar waveguide that includes a first material and a second athermal material different than the first material and adjacent to the first material and the planar waveguide may define an input light path and an output light path. The optical device may also include an input waveguide configured to direct light into the planar waveguide, where the light may propagate on the input light path, a diffraction grating configured to reflect light received from the planar waveguide to propagate on the output light path, a first output waveguide configured to receive the reflected light from the planar waveguide and reflected from the diffraction grating, and a second output waveguide configured to receive the reflected light from the diffraction grating. In some examples, the input waveguide, the first output waveguide, and the second output waveguide may be located on a Rowland circle. In some examples, the input light path may pass through the first material and the second athermal material. In some examples, the optical device may include a set of optical taps configured to receive the light from the one or more light sources, direct a first portion of the light to the input waveguide, and direct a second portion of the light toward a sample. In some examples, the optical device may include a set of detectors configured to receive light from the first output waveguide and the second output waveguide, where the first material and the second athermal material cooperate to define at least part of the output light path, the output light path may be located between the first output waveguide and the second output waveguide on the Rowland circle, the first output waveguide and the second output waveguide may receive light from leakage modes of light on the output light path, and the output light path may direct light to the sample. In some examples, the diffraction grating may be configured to reflect light to a location on the Rowland circle between the first output waveguide and the second output waveguide. In some examples, the first output waveguide and the second output waveguide may receive light from leakage modes of light reflected from the diffraction grating.

In some examples, the light reflected from the diffraction grating corresponds to a first grating order of the diffraction grating. In some examples, the optical device may include a first detector configured to receive light corresponding to a second grating order of the diffraction grating and a second detector configured to receive light corresponding to a third grating order of the diffraction grating. In some examples, the optical device may include one or more light sources optically coupled to the input waveguide and one or more detectors optically coupled to at least one of the first output waveguide or the second output waveguide, where the one or more light sources and the one or more detectors are located on the Rowland circle, the second athermal material is located such that the input light path passes through the second athermal material, and the second athermal material is located such that the output light path does not pass through the second athermal material.

In some examples, the present disclosure describes a method for monitoring wavelengths in an optical sensing system. The method may include transmitting one or more control signals to one or more light sources, emitting light from the one or more light sources through one or more input waveguides and along one or more input light paths, where the emitted light is based on the one or more control signals, directing a first portion of light to a sample, directing a second portion of light to a planar waveguide, where the second portion of light propagates through the planar waveguide along one or more output light paths. In some examples, the planar waveguide may include a first material, and a second athermal material that is adjacent to the first material and different than the first material. The method may further include reflecting the second portion of light from a diffraction grating and through the planar waveguide, receiving the light from the planar waveguide, via one or more output waveguides, at one or more detectors, generating, by the one or more detectors, one or more detector signals indicative of the light received by the one or more detectors, determining a monitored wavelength from the one or more detector signals, determining a difference between the monitored wavelength and a target wavelength, and generating one or more adjusted control signals based on the difference between the monitored wavelength and the target wavelength. In some examples, the emitted light may be based on the one or more control signals and the second portion of light propagates through the planar waveguide along one or more output light paths.

In some examples, the operation of receiving the light from the planar waveguide, via the one or more output waveguides, using the one or more detectors may include optically coupling some of the light from the planar waveguide to a first detector and a second detector of the one or more detectors. In some examples, the operation of receiving the light from the planar waveguide, via the one or more output waveguides, using the one or more detectors may include receiving the light from the planar waveguide at one of the one or more output waveguides that is positioned on a Rowland circle and located between a first detector and a second detector of the one or more detectors. In some examples, the operation of receiving the light from the planar waveguide at one of the one or more output waveguides may include receiving a mode of light by the first detector and the second detector, where the mode of light is leaked from the one of the one or more output waveguides that is located between the first detector and the second detector. In some examples, the operation of receiving the light from the planar waveguide may include receiving first detected light using a first detector, the first detected light corresponding to a first grating order of the diffraction grating and receiving second detected light using a second detector, the second detected light corresponding to a second grating order of the diffraction grating. In some examples, a ratio may be used to determine a size and a location of the second athermal material. In some examples, the ratio may be a total length of the input and output light paths that pass through the first material divided by a total length of the input and output light paths that pass through the second athermal material.

In addition to the example aspects and embodiments described above, further aspects and embodiments will become apparent by reference to the drawings and by study of the following description.

BRIEF DESCRIPTION OF THE DRAWINGS

The use of the same or similar reference numerals in different figures indicates similar, related, or identical items.

Figure 1:
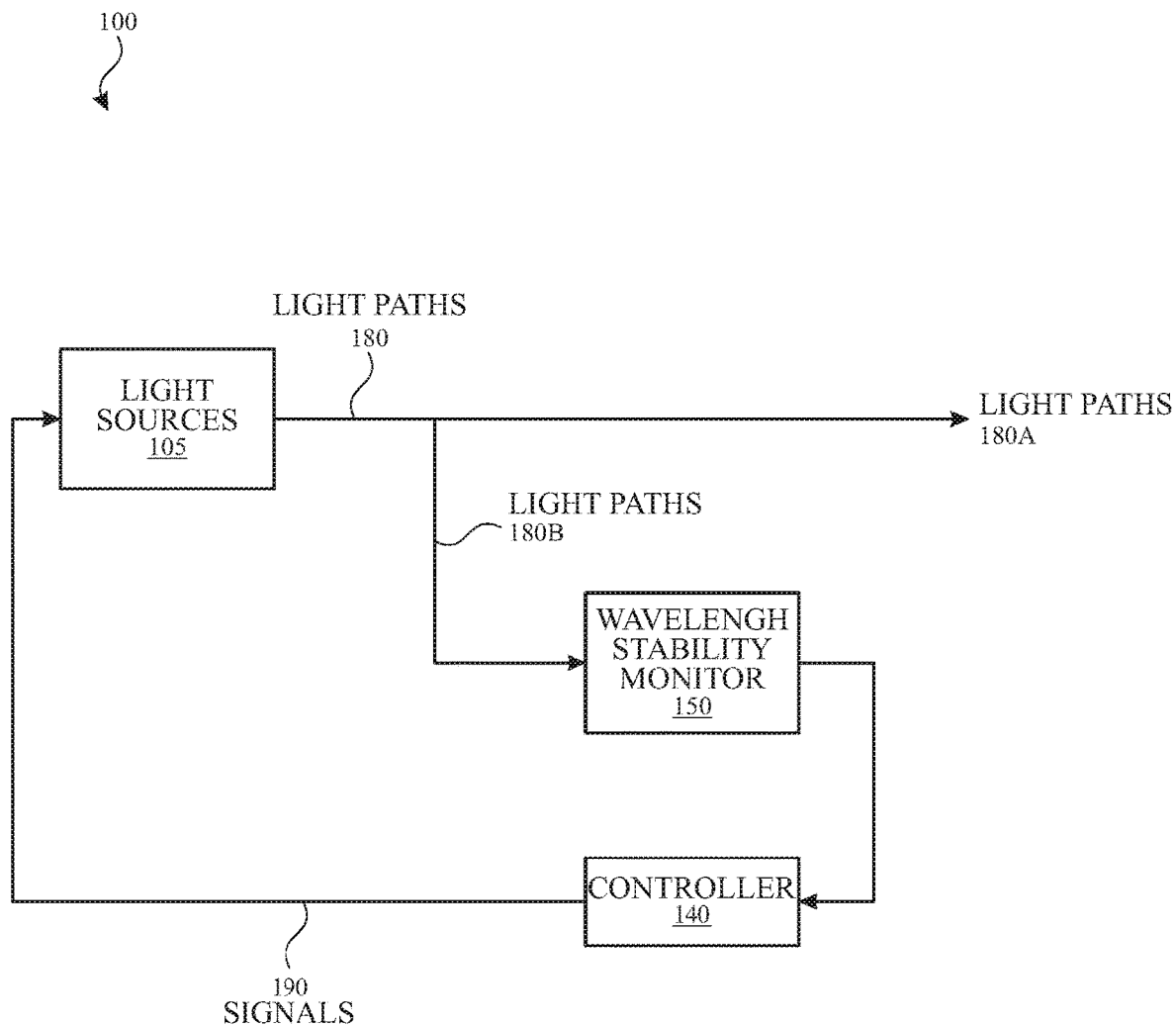
FIG. 1 illustrates a block diagram of a wavelength stability monitoring system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures, nor does it imply or signify that any element or figure is cross-sectioned.

Additionally, it should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to any single embodiment. To the contrary, it is intended to cover alternatives, modifications, and equivalents as can be included within the spirit and scope of the described embodiments as defined by the appended claims. Likewise, although multiple embodiments are described with certain terminology, elements, and structures, it should be appreciated that any embodiment disclosed herein may incorporate terminology, elements, and/or structures disclosed with respect to other embodiments.

Generally, wavelength stability monitoring systems may monitor various properties of light emitted by light sensors, such as power output and wavelength, and these monitoring systems may be designed as on-chip monitors on photonics assemblies. In some examples, the monitoring systems may be wavelength sensitive components including, but not limited to, a Mach-Zehnder interferometer (MZI), arrayed waveguide gratings (AWG), and diffraction gratings.

In some examples, on-chip monitors may be affected by temperature variations that may be generated by different components of the system, such as lasers, current sources, power sources, and so forth. The temperature variations may affect systems with a semiconductor platform which may be temperature sensitive, such as indium phosphide or silicon on insulator systems. In some examples, the temperature variations may cause refractive indices of the wavelength stability monitor materials to shift, which may cause the wavelengths of light to shift. When the refractive indices shift, this may cause wavelength shifts, and the accuracy of the wavelength stability monitoring system may be negatively affected. Additionally, the variations in temperature, refractive indices, wavelengths, and so forth may cause undesirable latency in the main optical system. Although these variations in temperature may be accounted for, this may consume increased power. Thus, a low-latency, low-power wavelength stability monitor that may mitigate and/or compensate for the temperature variations is discussed herein.

Disclosed herein is a wavelength stability monitoring system that mitigates thermal wavelength shifts. The wavelength stability monitoring system may include a planar waveguide including a first material, such as crystalline silicon, and a second athermal material, such as amorphous silicon. The input and output light paths of the planar waveguide may allow light to propagate through the first material and the second athermal material so that the corresponding path lengths of light that passed through each material are used to determine a ratio. In some examples, the second athermal material may be adjacent to the first material. The ratio may be the same or approximately the same for all sets of input and output light propagating at different angles. In some examples, the athermal material may be located along both the input and output light paths while, in other examples, the athermal material may be located only along the input light paths of light propagating toward the diffraction grating or only along the output light paths of light propagating from the diffraction grating toward the output waveguides. In still other examples, there may be multiple areas of athermal material to mitigate thermal wavelength shifts in different light paths.

In some examples, the location of the input waveguides and the output waveguides may be based on mode coupling. The light reflected from the diffraction grating may be directed to a position between the output waveguides, and the light may couple to the output waveguides. In some examples, the light reflected from the diffraction grating may be directed to a primary output waveguide that may be between the output waveguides and may provide light to a sample or to the main optical system. The light from the primary output waveguide may couple to the other output waveguides and the light may have higher order modes than the light received by the primary output waveguide. That is, each of the output waveguides may be associated with a different grating order of the diffraction grating.

In a further examples, the primary output waveguide that directs light to a sample or the main system may be located between the first and second output waveguides and a mode mismatch can be introduced by creating a size mismatch in the input and output waveguides. The first and second output waveguides can receive light having the leakage modes of the primary output waveguide. In some examples, the primary output waveguide may allow modes to couple out of or leak out of the primary output waveguide, which may be received by the first and/or second output waveguide.

These and other embodiments are discussed below with reference to FIGS. 1-13. However, those skilled in the art will readily appreciate that the detailed description given herein with respect to these Figures is for explanatory purposes only and should not be construed as limiting.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

System Overview

FIG. 1 illustrates a block diagram of a wavelength stability monitoring system. The wavelength stability monitoring system 100 may include light sources 105, a wavelength stability monitor 150, and a controller 140. In FIG. 1, the light sources 105 may emit light which may be directed along a light path 180A to a sample (not illustrated in FIG. 1) and along a light path 180B to a wavelength stability monitor 150. The wavelength stability monitor 150 may be used to detect light received from the light sources 105 and may direct the detected signal to the controller 140.

Generally, the wavelength stability monitoring system 100 may ensure that the light sources are emitting light with a target wavelength or wavelength range and/or that have a certain amount of wavelength stability. The light sources may emit light in which each light source may emit the same wavelength of light as one another or each light source may emit a different wavelength of light from one another so that collectively the light sources 105 may emit a wavelength of light or a wavelength range of light.

The light sources 105 may emit light that propagates along light path 180 and which may be split into two light paths 180A and 180B. The term "light path" may be used herein to describe the propagation of light from one optical element to another and it may be understood that the light path may be within a waveguide or free space as appropriate for the example. In some examples, light propagating on light path 180A may be directed to a sample, where the light may be used for measuring properties of the sample. Light propagating on light path 180B may be directed to the wavelength stability monitor 150, where the light may be used for measuring and monitoring properties of the light.

The wavelength stability monitor 150 may receive light from the light sources 105 and along light path 180B as input light. The wavelength stability monitor 150 may sense the input light using any type of detector (detector not illustrated in FIG. 1), such as a diode that measures photons impinging on its active area. The detectors may generate a detector signal indicative of properties of the input light and these detector signals also may be the output detector signals of the wavelength stability monitor 150 provided to the controller 140. Generally, the detector signals may be signals outputted by the detectors. In some examples, the detectors may be part of the wavelength stability monitor 150 and, in other examples, the detectors may not be part of the wavelength stability monitor 150 and, instead, may be part of the wavelength stability monitoring system 100 and coupled to the wavelength stability monitor 150.

The wavelength stability monitoring system 100 may include one or more additional components not illustrated in FIG. 1, such as, but not limited to, filters, amplifiers, analog-to-digital converters (ADCs), any combination thereof, and so forth, located between the wavelength stability monitor 150 and the controller 140. These additional components may use the signals from the wavelength stability monitor 150 for further signal processing, such as amplifying the signals, using the signals for comparisons or calculations, any combination thereof, and so forth. The wavelength stability monitoring system 100 may include any component or circuitry as appropriate to achieve the monitoring functionality as described herein.

The wavelength stability monitor 150 may provide the detector signals to the controller 140, which may be used as feedback in a control loop. The controller 140 may process the detector signals to determine a monitored wavelength(s) of the light sources 105. The controller 140 may additionally determine differences between the monitored wavelength(s) and a target wavelength of the light sources 105. In some examples, properties of the light emitted by the light sources 105 may be monitored due to system variability which may be caused by power variations, current variations, thermal variations, deterioration of the light sources, and so forth. The controller 140 may then use the difference between the monitored wavelength(s) and target wavelength(s) to generate an adjusted control signal 190 that may be transmitted to the light sources 105. Control signals may generally be signals that are outputted by the controller 140. In some examples, the adjusted control signal 190 may be the same control signal that was previously provided to the light sources 105 and, in other examples, the adjusted control signal 190 may be different than the previous control signal provided to the light sources 105. The adjusted control signal 190 may at least partially account for the system variabilities so that the light sources 105 may emit light with a wavelength closer to the target wavelength.

In some examples, the signal generated by the wavelength stability monitor 150 may be used to control the light sources 105. That is, some of the functionality of the controller 140 may be included in the wavelength stability monitor 150. For example, the signal outputted from the wavelength stability monitor 150 may be indicative of properties that may cause variations in the light received from the light sources 105, such as thermal shifts, current shifts, power shifts, degradation of the light sources, and so forth.

In some examples, the wavelength stability monitor 150 may provide multiple output signals to the controller 140 (not illustrated in FIG. 1). The wavelength stability monitor 150 may include multiple on-chip detectors which may each generate a detector signal and the one or more detector signals may be transmitted to the controller 140 via one or more detection channels. In some examples, the wavelength stability monitor 150 also may include a primary output channel that may provide light to the sample. In the example that the monitored wavelength is the same as or approximately the same as the targeted wavelength, the detection channels may have zero or approximately zero values and the primary output channel may have a high level of output light. In the example where the monitored wavelength is different than the targeted wavelength, the detection channels may provide feedback to the controller 140 for adjusting the control signals for tuning the light sources 105.

In some examples, the wavelength stability monitoring system 100 may lock to a target wavelength of a wavelength range, which in some examples may be a broadband wavelength range. In some example embodiments, a "broadband wavelength range" may be generally a set of wavelengths over the approximate range of 1 μm. In some examples, the 1 μm emitted and/or detected broadband wavelengths may be in the "broadband" range of approximately 1.0 μm to 3.0 μm. Accordingly, embodiments described herein may operate over (e.g., lock to) an operating range that may correspond to, or be encompassed in, a broadband wavelength range. Examples of such operating ranges include 1.0 μm-2.0 μm, 1.3 μm-2.3 μm, 1.4 μm-2.4 μm, 1.5 μm-2.5 μm, and so forth. Although specific wavelength ranges may be discussed, any appropriate wavelength or wavelength range may be emitted and/or detected by the photonics elements described herein, depending on the use and construction of those elements.

The target wavelength may vary during device operation and, as the target wavelength varies over time, the wavelength stability monitoring system 100 may lock to the different target wavelengths accordingly. In some examples, the wavelength stability monitoring system 100 may lock the monitored wavelength to a target ratio, such as the ratio of the detector signals from the detectors. Additionally, the target ratio may temporally vary.

Figure 2:
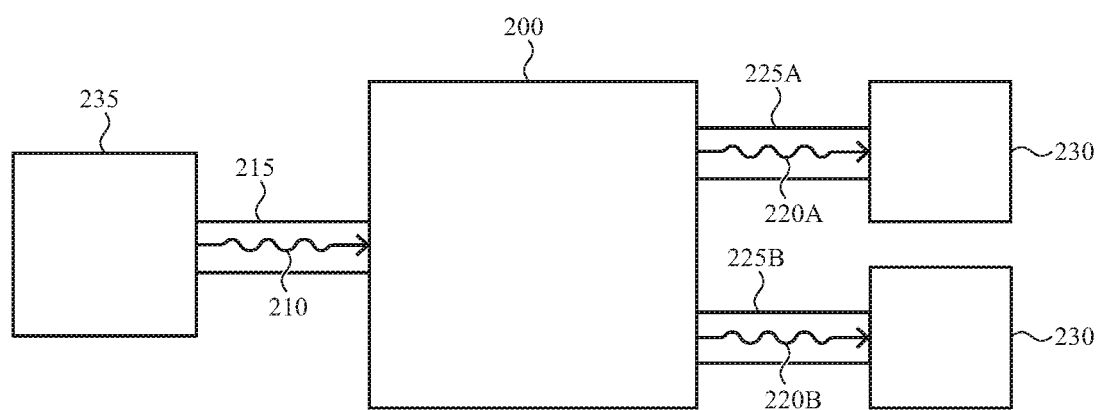
FIG. 2 illustrates a sample optical component with a diffraction grating.

FIG. 2 illustrates a block diagram of an optical component. In FIG. 2, the optical component 200 may be a de-multiplexer that may receive input light 210 from a light source 235 and route the received light to output light 220, which may be received by a detector 230. The input light 210 may be a single input and the output light 220 may include two or more outputs, such as output light 220A and output light 220B. Where discussed herein, the output light may be labeled generally as the output light 220, and individual instances or components with a separate element number, such as output light 220A and output light 220B, and so forth. Although the light source 235 is depicted as emitting light directly into the de-multiplexer, there may be additional optical components between the light source 235 and the de-multiplexer, and there may not be direct optical coupling between the de-multiplexer and the detector 230.

The optical component 200 may separate the output light 220 and the light separation may be wavelength dependent. The light may be separated and output as individual wavelengths or wavelength bands. The input light 210 may be provided by an input waveguide 215 and the output light 220 may be received by output waveguides 225A and 225B. As discussed herein, the output waveguides may be referred to as output waveguides 225 or individually with a separate element number for each output waveguide, such as output waveguides 225A and 225B. In some examples, the input and output waveguides may be strip waveguides. Although the input light 210 may be discussed as emitting light into the optical component 200, it may be understood that a light source not illustrated in FIG. 2 may provide light to the input waveguide 215. Similarly, the output waveguides 225 may be discussed as receiving output light 220, but the output waveguides 225 may provide the output light 220 to one or more light detectors that are not illustrated in FIG. 2. The detector(s) can include any type of diode that can respond to or measure photons impinging on its active area. The detector(s) can generate one or more detector signals indicative of the output light.

Optical Component with a Diffraction Grating

Figure 3:
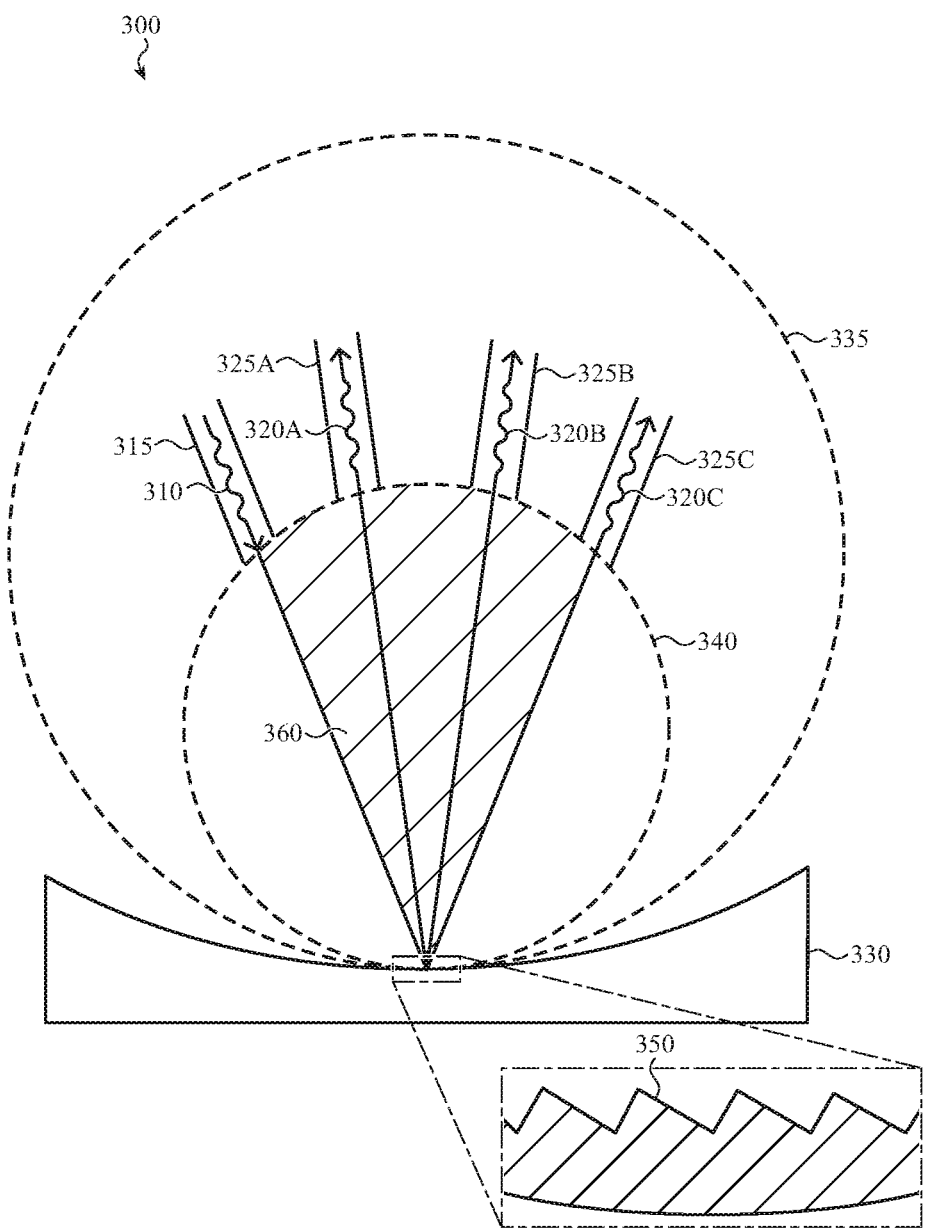
FIG. 3 illustrates an optical component with a diffraction grating.

FIG. 3 illustrates a simplified optical component with a diffraction grating. The optical component 300 is a general diffraction grating system. In FIG. 3, the optical component 300 may include an input waveguide 315, multiple output waveguides 325, and a diffraction grating 330. As illustrated in FIG. 3, the diffraction grating 330 may have a radius of curvature that is associated with an imaginary diffraction grating circle 335. The radius of curvature of the diffraction grating 330 may also be associated with another imaginary circle referred to herein as the Rowland circle 340. The Rowland circle 340 has a diameter that is approximately equal to the radius of the diffraction grating circle 335. In some examples, the input waveguide 315 and the output waveguides 325A, 325B, and 325C may be on the Rowland circle 340. When the input waveguide 315 emits input light 310 from somewhere on the Rowland circle 340 and toward the diffraction grating 330, then a beam reflecting off of the diffraction grating 330 may be split into reflected beams that may come into focus at other points on the Rowland circle 340. The single input waveguide and the three output waveguides are used for explanatory purposes only, as the optical component 300 may include one or more input waveguides and one or more output waveguides as appropriate.

In FIG. 3, for explanatory purposes only, the input waveguide 315 is located at a first position and the output waveguides 325 are located all to one side of the input waveguide 315; however, in other examples, the input and output waveguides may be arranged in different configurations. In some examples and as discussed with reference to FIGS. 4-13, the output waveguides 325 may be located on both sides of the input waveguide 315, there may be two input waveguides 315 that may be located on both sides of an output waveguide 325, and so forth.

The input waveguide 315 may emit input light 310 into a planar waveguide or slab waveguide 360, where the slab waveguide is represented by the shaded area. The planar waveguide will be discussed in further detail herein, but may not be represented with the shaded area as shown in FIG. 3. In FIG. 3, the planar waveguide 360 is defined by the optical path of the input light optical path and the optical path of the output light. Although the shaded area in FIG. 3 depicts the planar waveguide 360, in some examples, the planar waveguide 360 may extend outside of the shaded area of FIG. 3. In some examples, the area outside of the planar waveguide 360 may be a doped material to prevent the attenuation of input light and output light. The terms "planar waveguide" and "slab waveguide" may be used interchangeably herein.

In some examples, the input light 310 may be received by the input waveguide 315 from one or more light emitters (not shown in FIG. 3), and the input light 310 may propagate from the input waveguide 315 into the planar waveguide 360 toward the diffraction grating 330. The planar waveguide 360 may be optically coupled to the diffraction grating 330, so that the planar waveguide 360 may emit light that will reflect off of the diffraction grating 330. The input light 310 may then reflect off of the diffraction grating 330 and output light 320A, 320B, and 320C, and after being reflected may propagate back through the planar waveguide 360 toward the output waveguides 325A, 325B, and 325C, respectively. As previously discussed, the input waveguide 315 and the output waveguides 325 may be strip waveguides. The input waveguide 315 and the output waveguides 325 may be optically coupled to the planar waveguide 360 to reduce the loss of light at the interface of the waveguides.

Also shown in the expanded section of FIG. 3 are the diffraction grating facets 350 of the diffraction grating 330. The expanded section of FIG. 3 is for illustrative and explanatory purposes and is not to scale. Additionally, although four grating facets 350 are illustrated, the diffraction grating 330 may include any appropriate number of grating facets 350. Each of the grating facets 350 may be approximately equidistant from one another by a distance d. Additionally, the optical component 300 may include an input waveguide 315 for emitting light 310 toward the diffractive grating 330 and the output light 320 may be received at output waveguides 325.

The locations of the input waveguide 315 and the output waveguides 325 may depend at least partially on the radius of curvature of the diffraction grating 330. In some examples, the input waveguide 315 and the output waveguides 325 are located adjacent to the Rowland circle 340, and the Rowland circle 340 depends on the radius of curvature of the diffraction grating 330. Additionally, the grating facets 350 of the diffraction grating 330 may determine the angle at which the input light reflects off of the diffraction grating 330 in conjunction with the radius of curvature of the diffraction grating 330. In turn, the angle at which the light reflects determines the location of the output waveguides 325 on the Rowland circle 340. Although the input and output waveguides are discussed as being located on the Rowland circle 340, in some examples, the input and output waveguides may not be located on the Rowland circle 340.

In FIG. 3, the input light 310 propagates in the planar waveguide 360. As the light propagates, this may be discussed herein as the light being emitted on an input light path or an optical path, where the terms "light path" and "optical path" may be used interchangeably. Similar to the input light, when the output light 320 propagates from the diffraction grating 330 through the planar waveguide 360, this may be described as the output light being received on an output light path. Similar configurations of optical systems including a diffraction grating, a planar waveguide, and input and output waveguides will be discussed in detail with reference to FIGS. 4-13.

Athermal Mitigation and Diffraction Gratings

Figure 4:
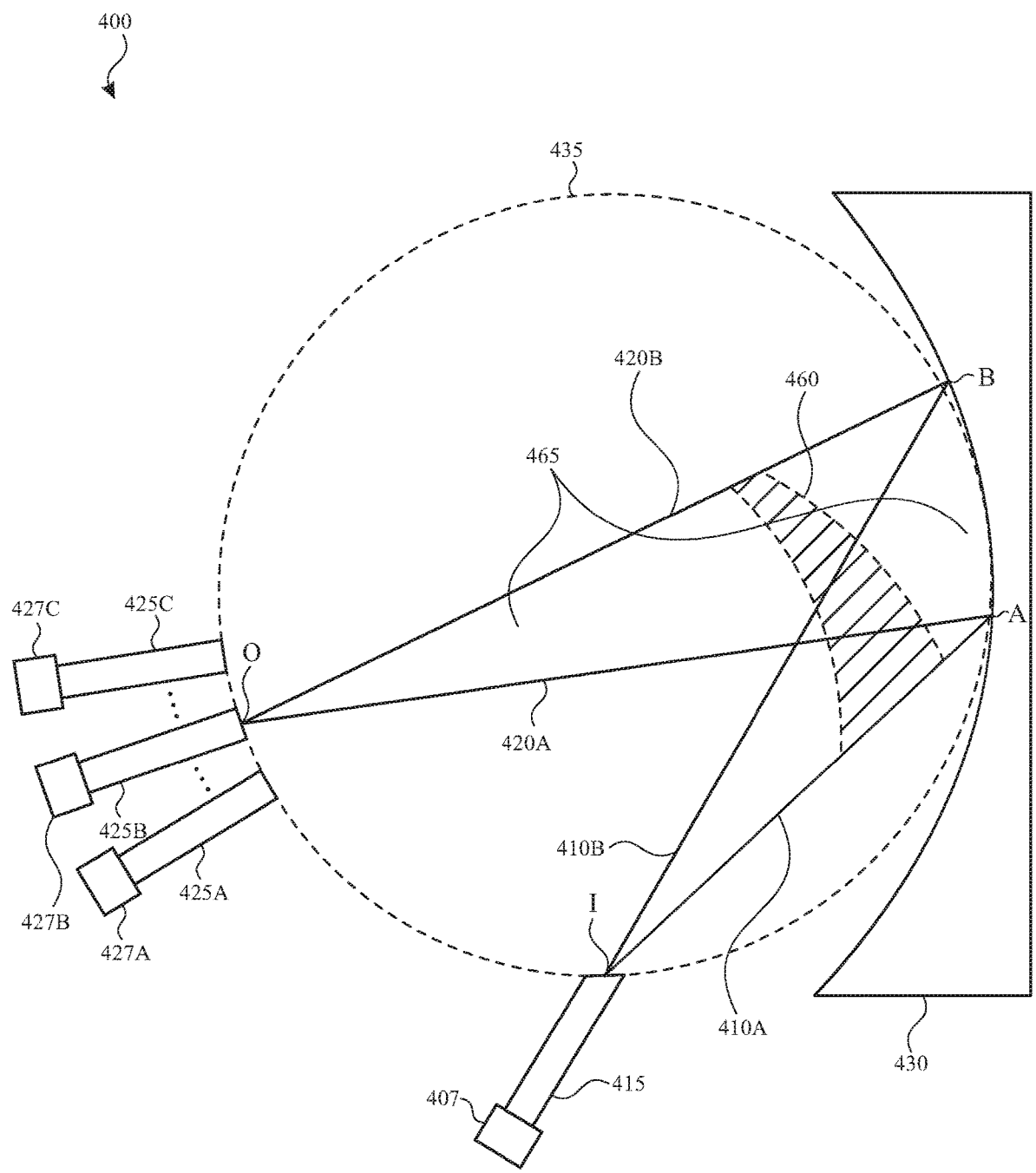
FIG. 4 illustrates an optical component with a diffraction grating.

FIG. 4 illustrates an optical component with a diffraction grating. The optical component 400 may function as a wavelength stability monitor and may include an input waveguide 415, light source 407, output waveguides 425, detectors 427, and a diffraction grating 430. Although only one input waveguide 415 and one light source 407 are illustrated, multiple light sources and multiple input waveguides may be employed in any or all embodiments as appropriate and as described herein. Additionally, three output waveguides and detectors are shown, but fewer or more output waveguides and detectors may be employed in any or all embodiments as appropriate and as described herein. As discussed in FIG. 3, the Rowland circle 435 is an imaginary circle. Although the borders of the planar waveguide are not illustrated, the input waveguide 415 and the output waveguides 425 may be positioned so that light may be input to and output from a planar waveguide on the circumference of the Rowland circle 435. The planar waveguide may receive light from the input waveguide 415 and may output light that is reflected by the diffraction grating 430 to the output waveguides 425. In some examples, the diffraction grating 430 may be an Echelle grating. In some examples and similar to FIG. 3, the planar waveguide of FIG. 4 may extend to at least the input light path 410A and to the output light path 420B. Generally, the planar waveguide may extend at least to the outermost input and output light paths.

The light source 407 may emit light into the input waveguide 415 and the light may be emitted into the planar waveguide along the input light path 410A. In some examples, the light sources 407 may emit light that is a single wavelength or may emit light over a wavelength range. In FIG. 4, the light source 407 may emit light over a wavelength range. The light may propagate along the input light path 410A toward the diffraction grating 430 and reflect off of the diffraction grating 430 at a location A. The light also may propagate along the input light path 410B toward the diffraction grating 430 and reflect at a location B. The light reflecting off of the diffraction grating 430 at location A may propagate through the planar waveguide and along the output light path 420A and the light reflecting off of the diffraction grating 430 at location B may propagate through the planar waveguide and along the output light path 420B. The light propagating along the output light paths 420A and 420B may be received by the output waveguide 425B which may be optically coupled to the detector 427B.

In some examples, the optical component 400 may be an athermal device. In FIG. 4, the material 465 may be a first material and the material 460 may be a second athermal material, different than the first material, where the second athermal material is adjacent to the first material. In some examples, the first material and the second athermal material may have different temperature coefficients of refractive index. In some examples, the first material 465 may be crystalline silicon and the second athermal material 460 may be amorphous silicon.

Generally, the wavelength of the light directed to the detector(s) 427 by the diffraction grating 430 may be related to various factors including, but not limited to: the number of diffraction grating facets between the locations A and B of the grating 430, the diffraction grating order, the effective refractive index of the waveguide, the temperature or variation in temperature of the optical component 400, the radius of curvature of the diffraction grating, the blaze angle of the diffraction grating facets, any combination thereof, and so forth. In some examples, when the temperature of the optical component 400 varies, the effective refractive index of the planar waveguide materials may change, which can cause a shift in the wavelength of light received by the detector(s). Due to the refractive index of the planar waveguide materials shifting with temperature, the wavelength stability monitor may output wavelengths of light that are not indicative of the wavelengths emitted by the light sources. In this case, the controller may generate incorrect control signals to the light sources, which may erroneously adjust the light sources.

In the example of FIG. 4, the input light paths 410A and 410B as well as the output light paths 420A and 420B may both propagate through the first material 465 and the second athermal material 460. In FIG. 4, the second athermal material 460 is adjacent to the first material 465 on the side of the diffraction grating 430 and on the side of the input waveguide 415 and output waveguides 425. In some examples, the first material 465 may extend past the input light path 410A and the output light path 420B. The light provided by the input waveguide 415 may propagate along input light paths 410A and 410B in the planar waveguide, which may pass through the first material 465 of the planar waveguide, pass through the second athermal material 460 of the planar waveguide, and then may pass through the first material 465 of the planar waveguide before being incident on the diffraction grating 430.

After being reflected by the diffraction grating 430, the light may propagate along output light paths 420A and 420B in the planar waveguide, which may pass through the first material 465 of the planar waveguide, pass through the second athermal material 460 of the planar waveguide, and then may pass through the first material 465 of the planar waveguide before being received by the output waveguide 425B. Although the input and output light paths are depicted as lines and the input and output points are depicted as points throughout the discussion herein, it may be understood that light is emitted as a light beam with a beam spread and received as a light beam with a beam spread.

The light propagating along input light path 410A and output light path 420A may pass through both the first material 465 and the second athermal material 460 and a ratio may be determined between the path length of the light propagating through the first material 465 and the path length of the light propagating through the second athermal material 460. For any given set of input and output angles, the ratio of the path lengths traveling through the first material 465 and the second athermal material 460 may be the same or approximately the same. The path length may vary with the index of refraction which may shift with temperature, thus the second athermal material 460 may be chosen to mitigate this undesired effect.

In some examples, light may be received by one or more of the output waveguides 425. Because the diffraction grating 430 reflects light in a wavelength dependent manner, different wavelengths of light may be reflected at different angles through the planar waveguide. For example, output waveguide 425A may receive a different wavelength of light than output waveguide 425B. A relative shift of the light received at the detectors 427 may then be measured. In some examples, the ratios of wavelengths of light, power output of light, and so forth, received at the detector may be compared to determine wavelength shifts in the light that may occur at the light source. In FIG. 4, the athermal properties and location of the athermal material of the planar waveguide are designed to primarily mitigate wavelength shifts in the light received by the output waveguide 425B and thus, the detector 427B. In other examples, the athermal properties and location of the athermal material within the planar waveguide may be designed to primarily mitigate wavelength shifts in the light on the output light paths for any or all of the output waveguides and detectors.

Figure 5:
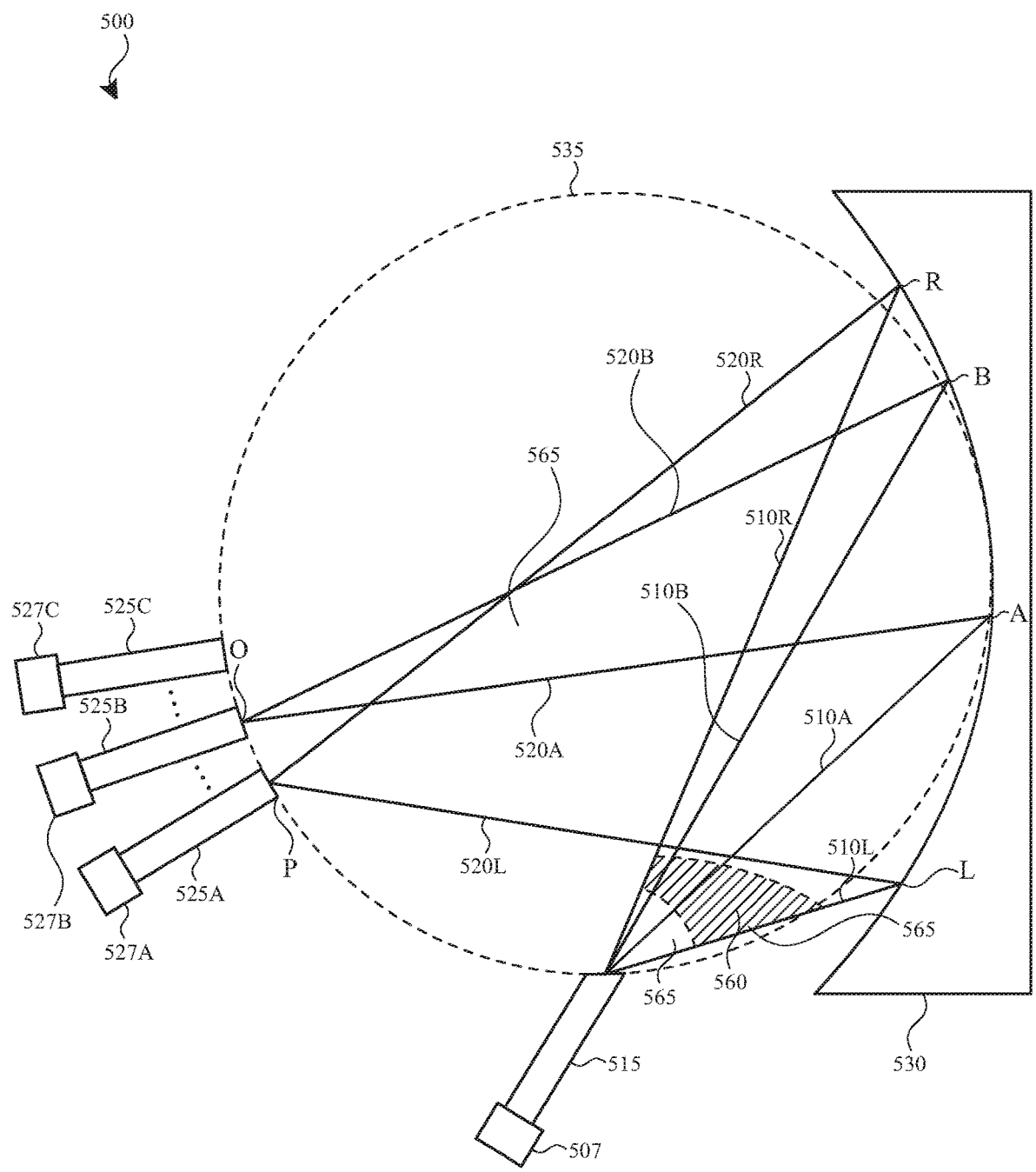
FIG. 5 illustrates an optical component with a diffraction grating.

FIG. 5 illustrates an optical component with a diffraction grating. Similar to FIG. 4, the optical component 500 may function as a wavelength stability monitor and may include a light source 507, an input waveguide 515, output waveguides 525, detectors 527, and a diffraction grating 530. The input waveguide 515 and the output waveguide 525 may be positioned near or on the Rowland circle 535 and coupled to the planar waveguide. Similarly numbered elements between figures may have similar functionality. For example, the detectors 527 of FIG. 5 may have similar functionality as the detectors 427 of FIG. 4. The diffraction grating facets may be located between positions R and L as indicated on the diffraction grating 530. That is, the diffraction grating facets which are located at locations L and R may be the outermost diffraction grating facets of the diffraction grating 530. Additionally, the input light paths 510L and 510R may be the outmost input light paths for light emitted by the light source 507.

In FIG. 5, light may be emitted by the light source 507 into the input waveguide 515. The planar waveguide may receive the light from the optically coupled input waveguide 515. The light from the input waveguide 515 may propagate along input light paths 510L, 510A, 510B, and 510R in the planar waveguide and may be incident on the diffraction grating 530 at positions L, A, B, and R. The light may reflect from the diffraction grating 530 and may be directed through the planar waveguide and toward the output waveguides 525. In FIG. 5, the borders of the planar waveguide are not illustrated, but may extend to at least the input light path 510L and to the output light paths 520B and 520R. Generally, the planar waveguide may extend at least to the outermost input and output light paths and may include the first material 565 and the second athermal material 560.

As depicted in FIG. 5, the second athermal material may be positioned in the planar waveguide between the input waveguide 515 and the diffraction grating 530, but not between the output waveguides 527 and the diffraction grating 530. In FIG. 5, the input light paths 510L, 510A, 510B, and 510R may propagate first through the first material 565 of the planar waveguide, through the second athermal material 560 of the planar waveguide, and then through the first material 565 of the planar waveguide before being incident on the diffraction grating 530. In FIG. 5, the light being reflected from the diffraction grating 530 and that propagates along output light paths 520L, 520A, 520B, and 520R may only pass through the first material 565 and not the second athermal material 560. Similar to FIG. 4, in FIG. 5 the second athermal material 560 is indicated with a cross-hatched section, while the remaining material of the planar waveguide may be the first material. The first material 565 may be crystalline silicon and the second athermal material may be amorphous silicon. Any second athermal material that has a temperature coefficient that varies differently than the first material may be used, where the index of refraction is approximately the same for both the second athermal material and the first material at room temperature.

As previously discussed, for the optical component 500 to function as an athermal wavelength stability monitor, the second athermal material may mitigate the effect of the path length varying with the temperature dependent index of refraction of the planar waveguide material. Even though the output light paths do not pass through the second athermal material 560, for any given set of input and output angles, the ratio of the path lengths traveling through the first material 565 and the second athermal material 560 may be the same or approximately the same.

In FIG. 5, the athermal properties and location of the athermal material of the planar waveguide are designed to primarily mitigate wavelength shifts in the light received by the output waveguide 525B and thus, the detector 527B. As depicted in FIG. 5, when using the single athermal material area, the component is designed to primarily mitigate thermal wavelength shifts with respect to detector 527B, but the detectors 527A and 527C may tolerate the thermal wavelength shifts. In other examples, the athermal properties and location of the athermal material within the planar waveguide may be designed to primarily mitigate wavelength shifts in the light on the output light paths for any or all of the output waveguides and detectors. In some examples, the closer the athermal material is located to the input waveguide, the smaller the athermal material area may be of the planar waveguide area.

In some examples, there may be more than one area of the second athermal material. For example, in FIG. 5 the second athermal material 560 is shown between the light source 507 and the diffraction grating 530, but an additional area of athermal material 560 could be positioned between the detectors 527 and the diffraction grating 530. Continuing this example, the thermal wavelength shift mitigation may be designed for multiple detectors 527 as opposed to primarily mitigating the thermal wavelength shift for one detector while the other detectors may tolerate the wavelength shift.

In still further examples, there may be an area of athermal material 560 located between the detectors 527 and the diffraction grating 530, but not between the light source 507 and the diffraction grating 530. Although FIGS. 4 and 5 have been discussed in the context of wavelength stability monitoring systems, the optical components 400 and 500 may also be employed as multiplexers, which may be coupled to one or more input channels and one or more output channels as appropriate.

Figure 6:
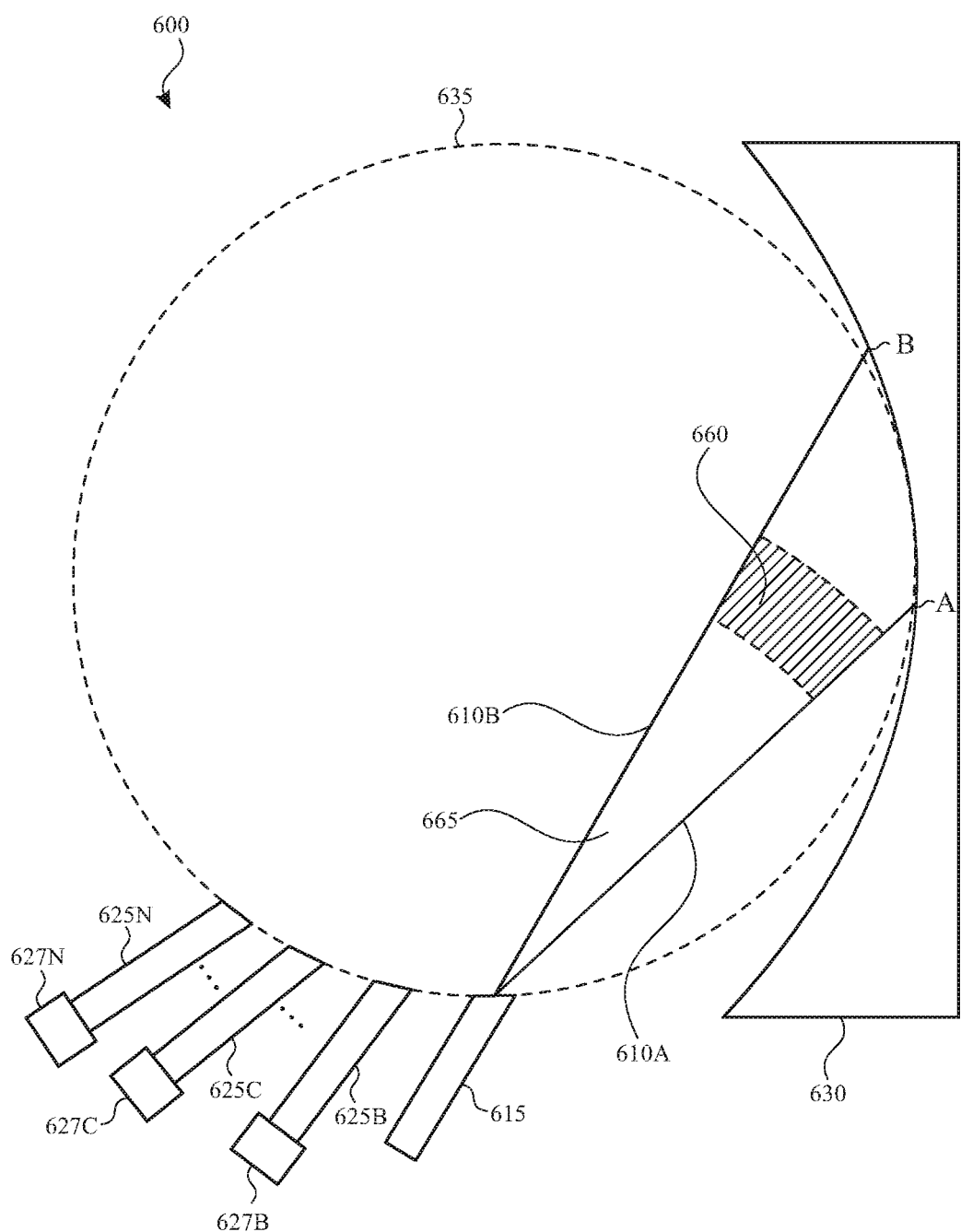
FIG. 6 illustrates an optical component with a diffraction grating.

FIG. 6 illustrates an optical component with a diffraction grating. The optical component 600 may include an input waveguide 615, output waveguides 625, detectors 627, and a diffraction grating 630. In FIG. 6, the input waveguide 615 may provide light to the planar waveguide. The planar waveguide may include a first material 665, such as crystalline silicon, and a second athermal material 660, such as amorphous silicon.

As illustrated in FIG. 6, the light received from the input waveguide 615 may propagate along a light path 610A toward the position A of the diffraction grating 630. In FIG. 6, the light traveling on the light path 610A may be reflected by the diffraction grating 630 so that it propagates back toward the input waveguide 615 and along the light path 610A. Similarly, the light provided by the input waveguide 615 may propagate along light path 610B and toward the position B on the diffraction grating 630. The light on light path 610B may reflect off of the diffraction grating 630 and back toward the input waveguide 615 and along the same light path 610B. The second athermal material 660 may be located in the planar waveguide so that the thermal wavelength shift may be primarily mitigated for the input and output angles of light emitted and received in the position of the input waveguide 615. The light that is retro-reflected back to the location of the input waveguide 615 may leak to the nearby output waveguides 625 and the leaked light may be at least partially mitigated for the thermal wavelength shift. Although the output waveguides 625 and the detectors 627 are illustrated only on one side of the input waveguide 615, the detectors 627 may be located only on the opposite side of the input waveguide 615, or on both sides of the waveguide 615.

Wavelength Stability Monitors

Figure 7:
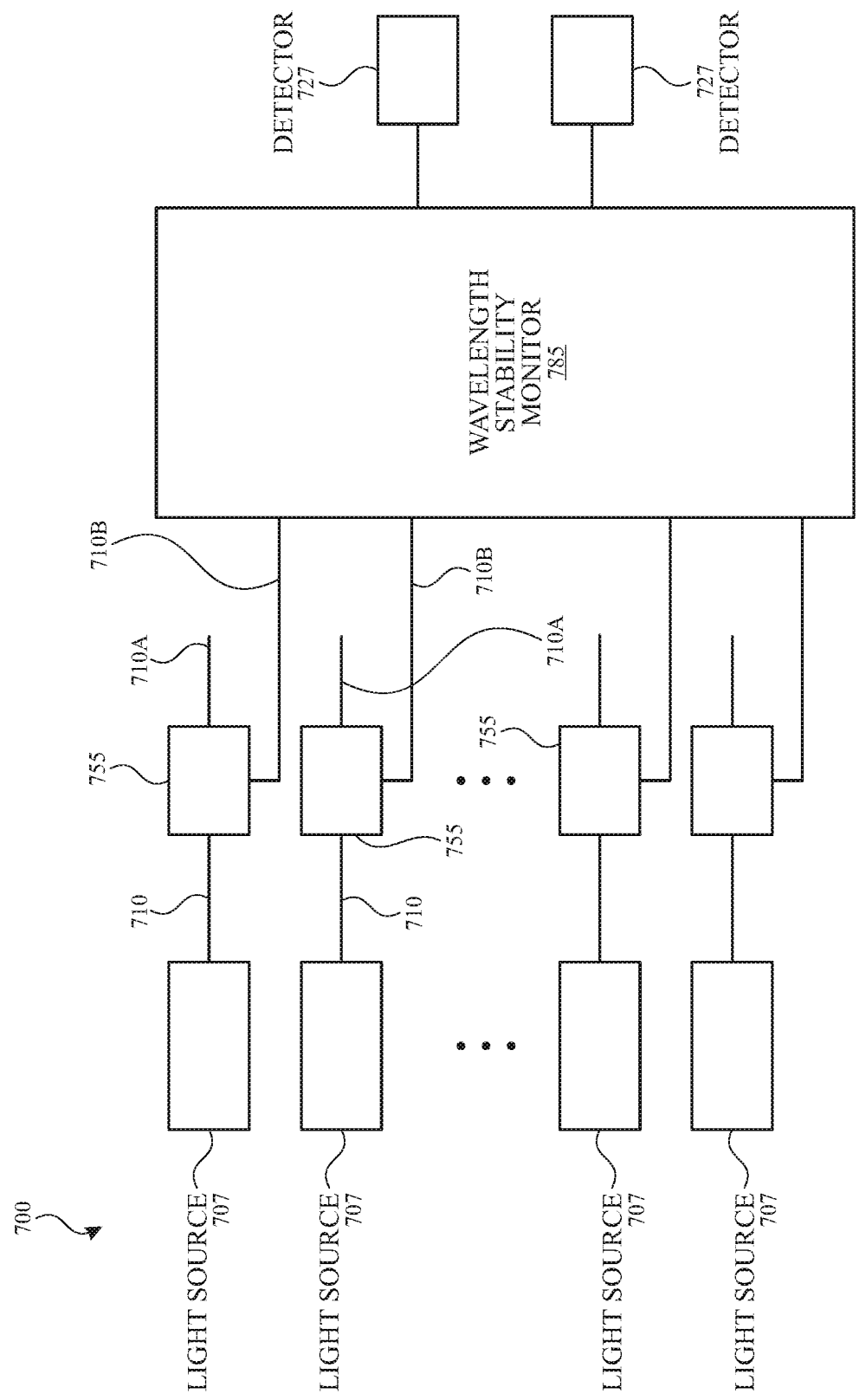
FIG. 7 illustrates a block diagram of a wavelength stability monitoring system.

FIG. 7 illustrates a block diagram of a wavelength stability monitoring system. The wavelength stability monitoring system 700 may include light sources 707, taps 755, a wavelength stability monitor 785, and detectors 727. In FIG. 7, the light emitted by the light sources 707 may be split by the tap 755 before being received by the wavelength stability monitor 785. In some examples, the tap 755 may split a first portion of light toward the wavelength stability monitor, where the first portion of light may be received by an input waveguide of the wavelength stability monitor (input waveguide not illustrated in FIG. 7). The tap 755 may also split a second portion of light toward a sample or provide the second portion of light to the main or primary optical system. In some examples, the light sources 707 may emit light having the same wavelengths of light or may emit light with different wavelength ranges of light. The number of light sources, taps, and detectors illustrated in FIG. 7 are for explanatory purposes only and any number of these elements may be used as appropriate.

The taps 755 may receive the light propagating along light path 710 and in a waveguide, such as a strip waveguide, and split the light onto a light path 710A and a light path 710B. The light propagating along light path 710B may be provided as input light to the wavelength stability monitor 785, using a waveguide (not shown in FIG. 7). The light propagating along light path 710A may be provided to a sample or may be emitted back into the main system.

Figure 8:
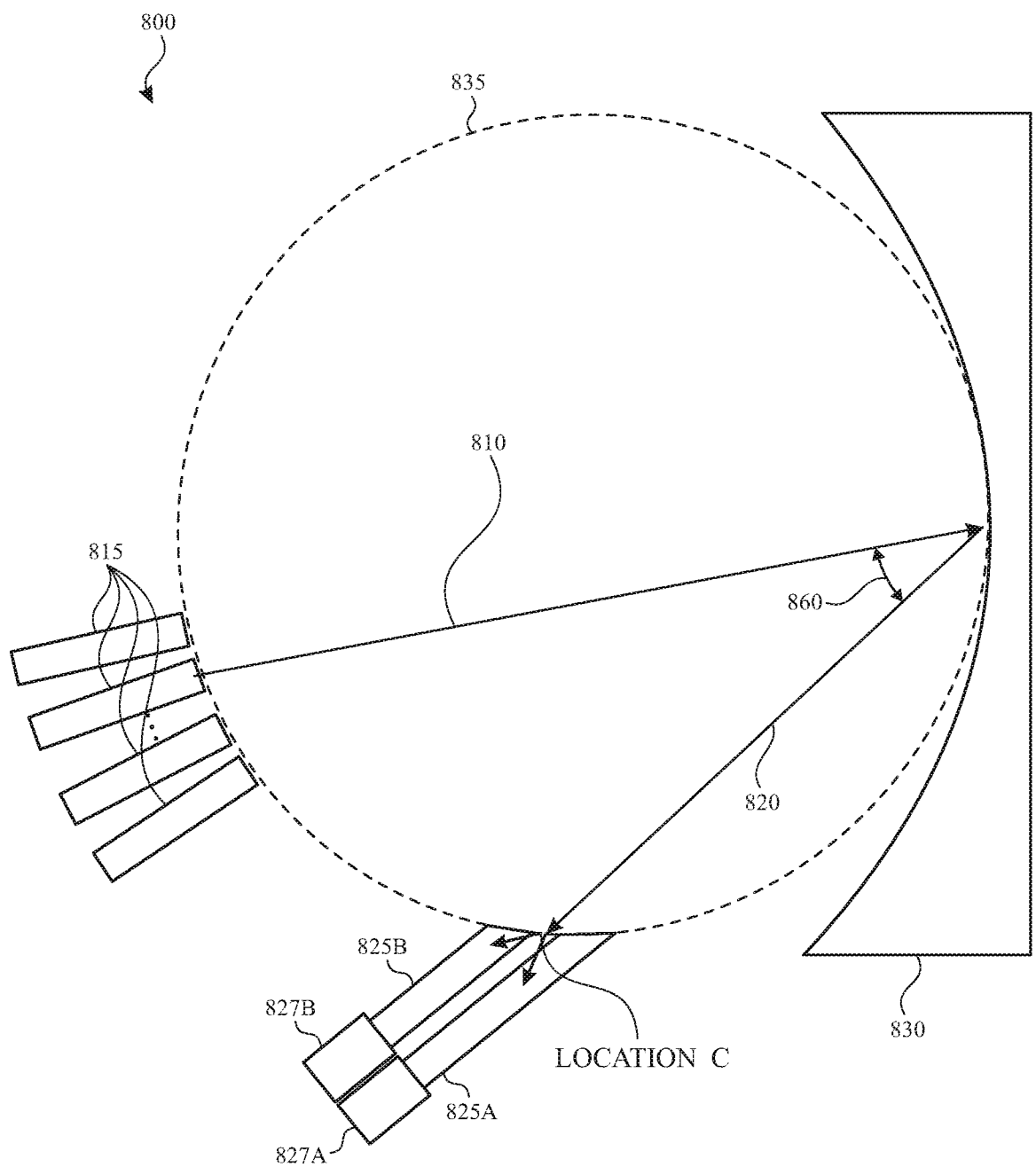
FIG. 8 illustrates an optical multiplexing component with a diffraction grating.

FIG. 8 illustrates an optical multiplexing component 800 with a diffraction grating. FIG. 8 does not illustrate the athermal material in the planar waveguide; however, the embodiment of FIG. 8 may be used in conjunction with any one of the athermal systems described herein. FIG. 8 includes input waveguides 815, output waveguides 825, detectors 827, and a diffraction grating 830. The light provided to the input waveguides 815 may be light that is emitted by light sources and split using a tap as discussed with respect to FIG. 7. The light that is split by the tap may be routed on a first path to a sample or into the optical system and on a second path to the input waveguides 815.

In FIG. 8, the light may be provided to the planar waveguide and propagate along input light path 810 toward the diffraction grating 830. The diffraction grating 830 may reflect the light along output light path 820 and in the direction of the output waveguides 825. As shown, the light propagating along output light path 820 may be incident at a position on the Rowland circle 835 located between the output waveguides 825A and 825B. The light may then couple into both of the output waveguides 825 and, in some examples, the light may leak into the output waveguides 825 from the location between the output waveguides 825. The angle 860 at which the light is reflected from the diffraction grating may be related to the wavelength of its corresponding light and the grating order. In some examples, each wavelength can be associated with multiple angles that correspond to different grating orders.

Figure 9:
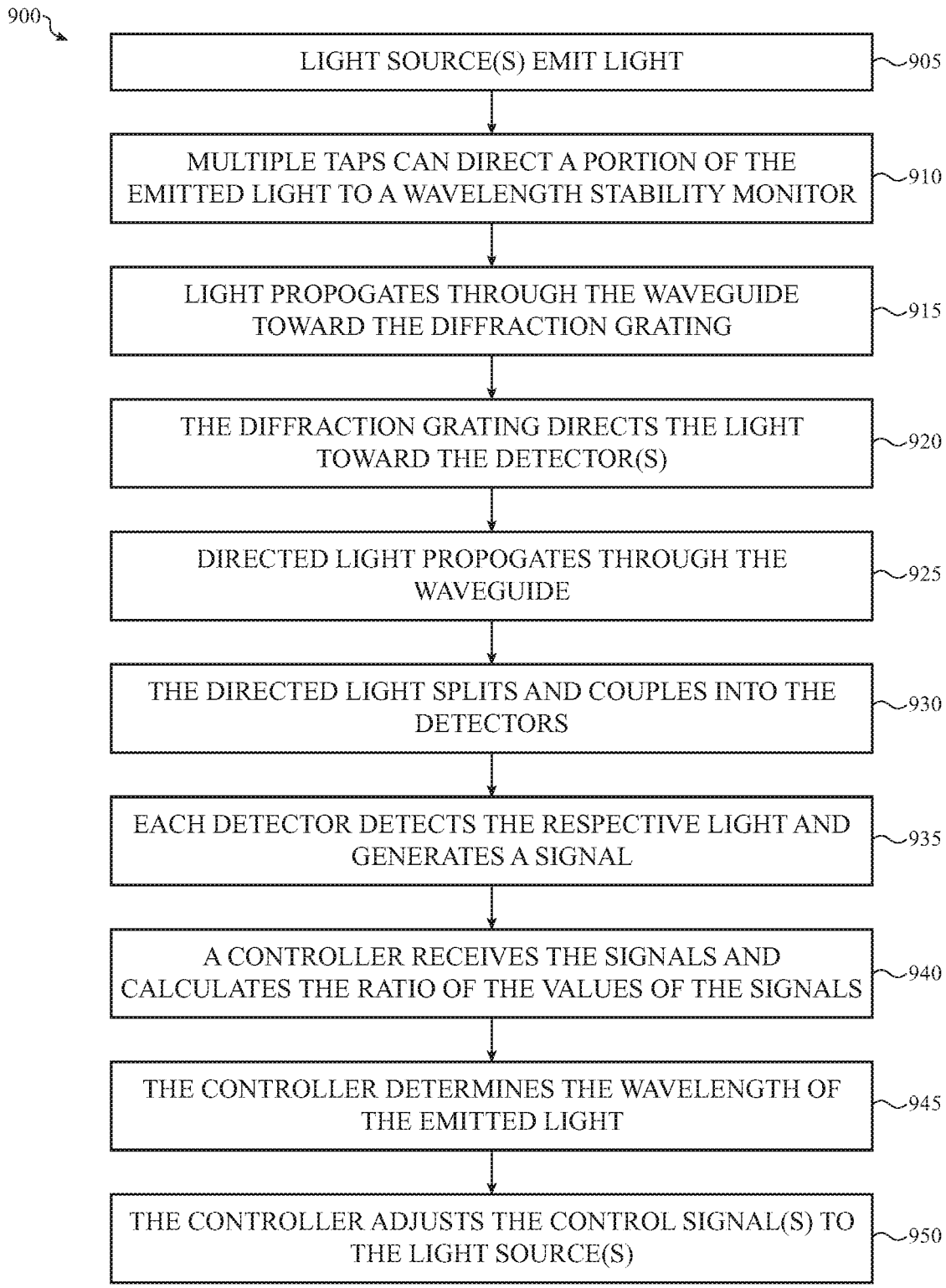
FIG. 9 illustrates a process flow for operating a wavelength stability monitoring system with a diffraction grating.

FIG. 9 illustrates a process flow for operating a wavelength stability monitoring device with a diffraction grating. The operations of process flow 900 may be applied to any of the embodiments described herein by including the various optical components with the diffraction grating and athermal material planar waveguides in the wavelength stability monitoring device.

At operation 905, the light sources may emit light toward one or more taps as appropriate and the multiple taps may split the emitted light into two paths, one of which is to a wavelength stability monitor as stated in operation 910. The wavelength stability monitor may include a planar waveguide and a diffraction grating as discussed with respect to FIGS. 4-8. At operation 915, the light may propagate through the planar waveguide and toward the diffraction grating. At operation 920, the diffraction grating may direct the light toward the one or more detectors and the directed light may propagate through the waveguide at operation 925.

At operation 930, the directed light may split and couple into the one or more detectors and each detector may detect the respective light and generate a detector signal as stated in operation 935. The detector may then provide the generated detector signals to a controller. At operation 940, the controller may receive the detector signals and calculate the ratio of the value of the detector signals and the controller may determine the wavelength of the emitted light at operation 945. In some examples, the value of the detector signals may be the power of the light detected by the one or more detectors. At operation 950, the controller may adjust the one or more control signals that are provided to the light source. In some examples, the control signals from the controller can adjust the pumping current to the laser such that the laser changes the wavelength of the emitted light.

Figure 10:
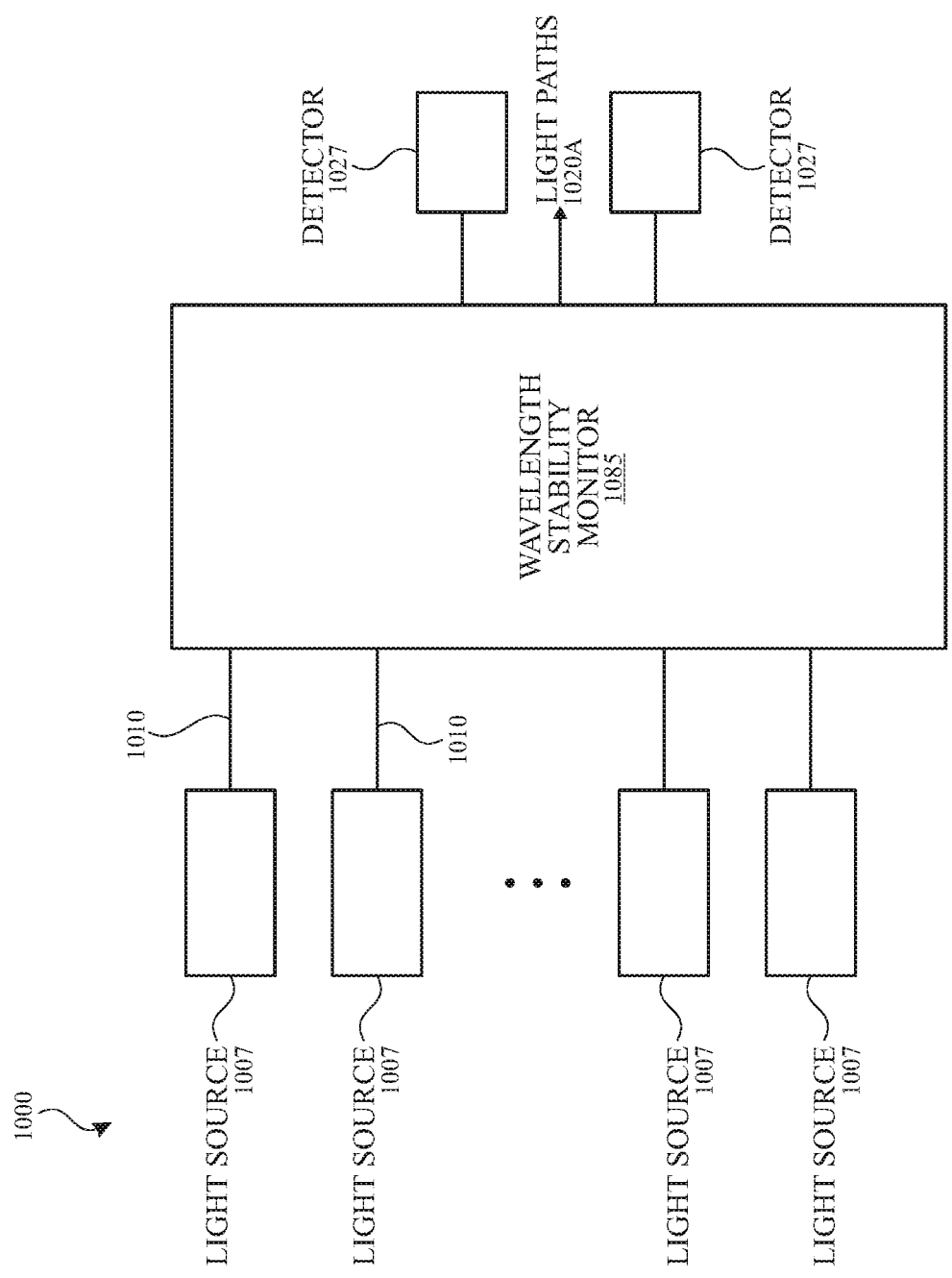
FIG. 10 illustrates a block diagram of a wavelength stability monitoring system.

FIG. 10 illustrates a block diagram of a wavelength stability monitoring system. The wavelength stability monitoring system 1000 may couple the light emitted by the light sources to the wavelength stability monitor without using a tap as discussed with respect to FIG. 7. The wavelength stability monitoring system 1000 may include light sources 1007, a wavelength stability monitor 1085, and detectors 1027.

In FIG. 10, the light sources 1007 may emit light on input light paths 1010 to the wavelength stability monitor 1085. In some examples, the light sources 1007 may emit a single wavelength of light or may emit wavelength ranges of light. The wavelength stability monitor 1085 may emit light to the detectors 1027 and also may emit light on a light path 1020A. The light propagating on light path 1020A may be directed toward a sample or into the main optical system. The light propagating on light path 1020A will be discussed in further detail with reference to FIG. 11.

Figure 11:
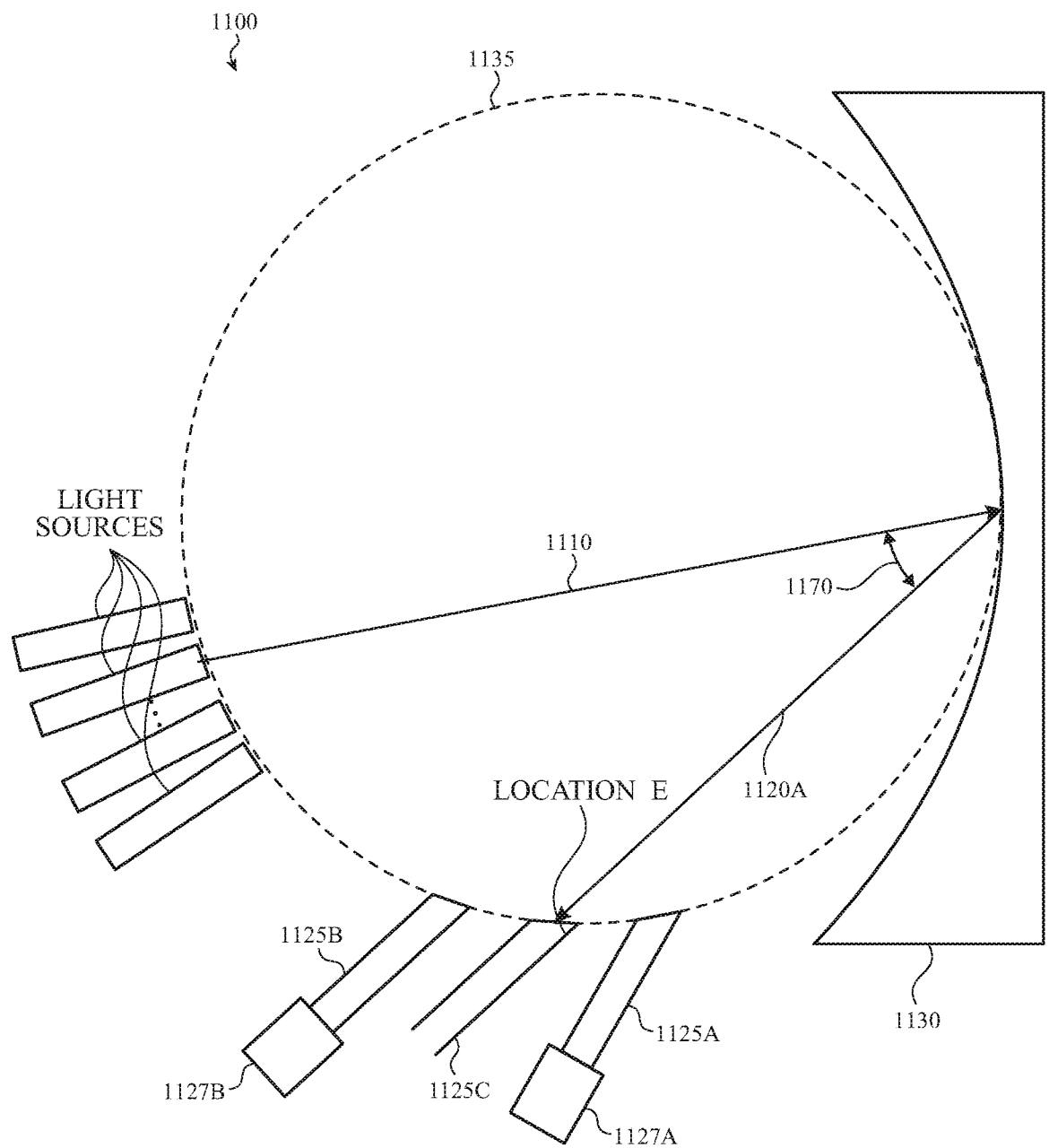
FIG. 11 illustrates an optical multiplexing component with a diffraction grating.

FIG. 11 illustrates an optical multiplexing component 1100 with a diffraction grating. FIG. 11 does not illustrate the athermal material in the planar waveguide; however the embodiment of FIG. 11 may be used in conjunction with any one of the athermal systems described herein. Similar to the previously discussed optical component of FIG. 8, the optical multiplexing component 1100 of FIG. 11 includes input waveguides 1115, output waveguides 1125, detectors 127, and a diffraction grating 1130.

In FIG. 11, light may be reflected by the diffraction grating 1130 along the output light path 1120A and toward the detectors 1127. The reflected light may be received by an output waveguide 1125 at location E that may provide the light to a sample or to the main optical system. The angle 1170 between the input light path 1110 and the output light path 1120A may be associated with various sets of angles which may correspond to different grating orders.

Similar to other embodiments described herein, the input and output waveguides may input light and receive output light to and from the planar waveguide at locations approximately on the Rowland circle 1135. The light incident at location E on the Rowland circle may be primarily directed to the sample or to the main optical system of which the optical multiplexing component 1100 is a part of, and part of the light may be coupled into the output waveguides 1125A and 1125B. A first grating order of light may be incident at the location E, but the detectors 1127A and 1127B may receive leaked light corresponding to a second grating order and a third grating order.

Figure 12:
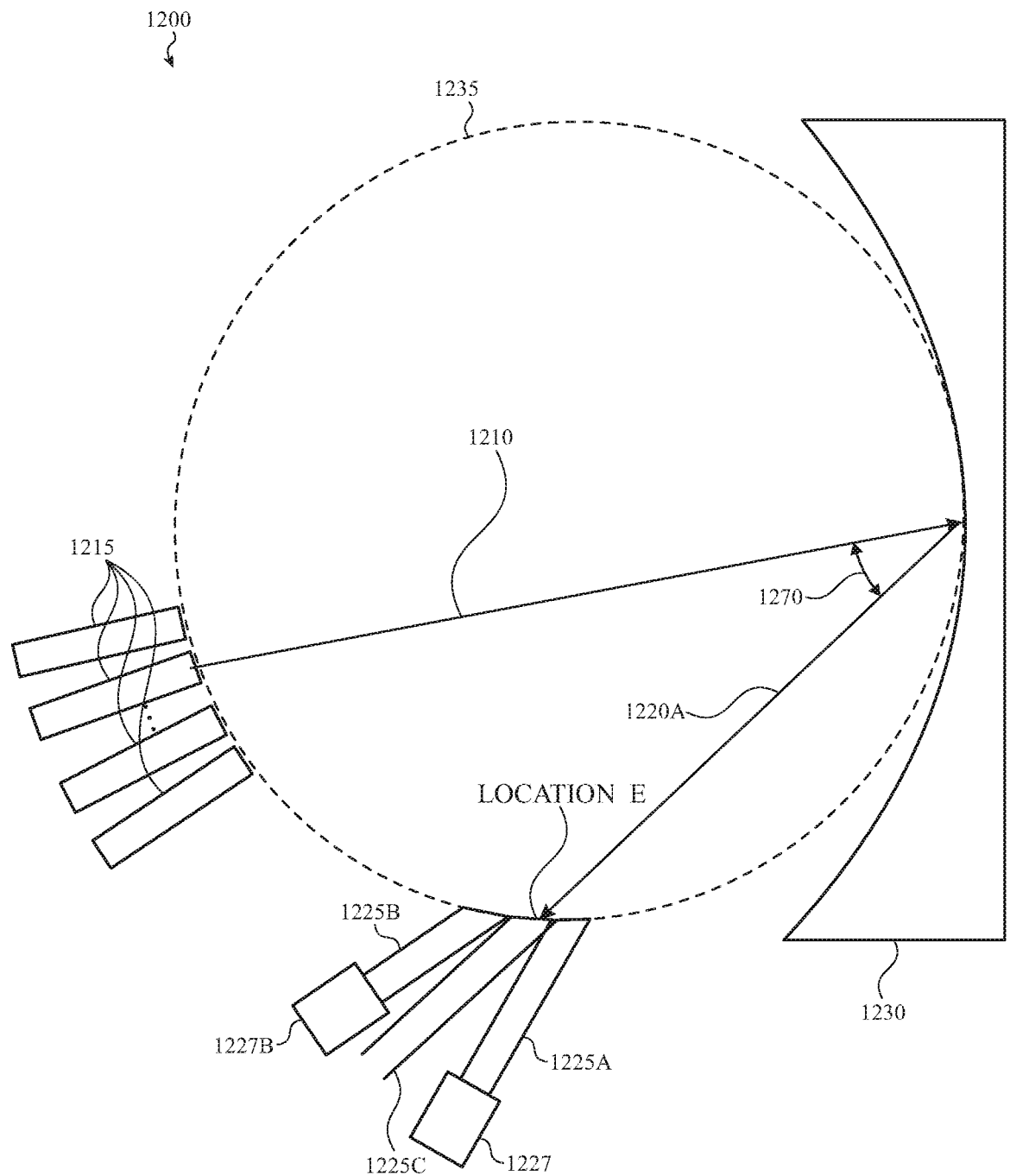
FIG. 12 illustrates an optical multiplexing component with a diffraction grating.

FIG. 12 illustrates an optical multiplexing component 1200 with a diffraction grating. FIG. 12 does not illustrate the athermal material in the planar waveguide; however, the embodiment of FIG. 12 may be used in conjunction with any one of the athermal systems described herein. Similar to previous optical components, the input waveguides may provide light to the planar waveguide that propagates along input light path 1210 and reflects off of diffraction grating 1230. The diffraction grating 1230 may direct the light along output light path 1220A and toward the detectors 1227. The angle 12700 at which the light is reflected from the diffraction grating 1230 may be related to the wavelength of its corresponding light and the grating order.

As illustrated in FIG. 12, the detectors 1227 may be located proximate to the location E, where light may be incident at a position approximately on or near the Rowland circle 1235. Similar to FIG. 11, in FIG. 12, the light reflected from the diffraction grating 1230 may propagate along the output light path 1220A in the planar waveguide and be incident at location E, which may be positioned near or on the Rowland circle 1235. In some examples, the size of the output waveguides 1225 may be smaller than the input waveguides 1215 and the difference in size may create a mismatch in optical modes. The mismatch in optical modes may allow the output waveguides 1225A and 1225B to receive light having leakage modes from the light coupled into the output waveguide 1225C. The output waveguide 1225C may allow modes of light to couple or leak out of the output waveguide 1225C, which may be received by or coupled into one or both of the output waveguides 1225A and 1225B.

Figure 13:
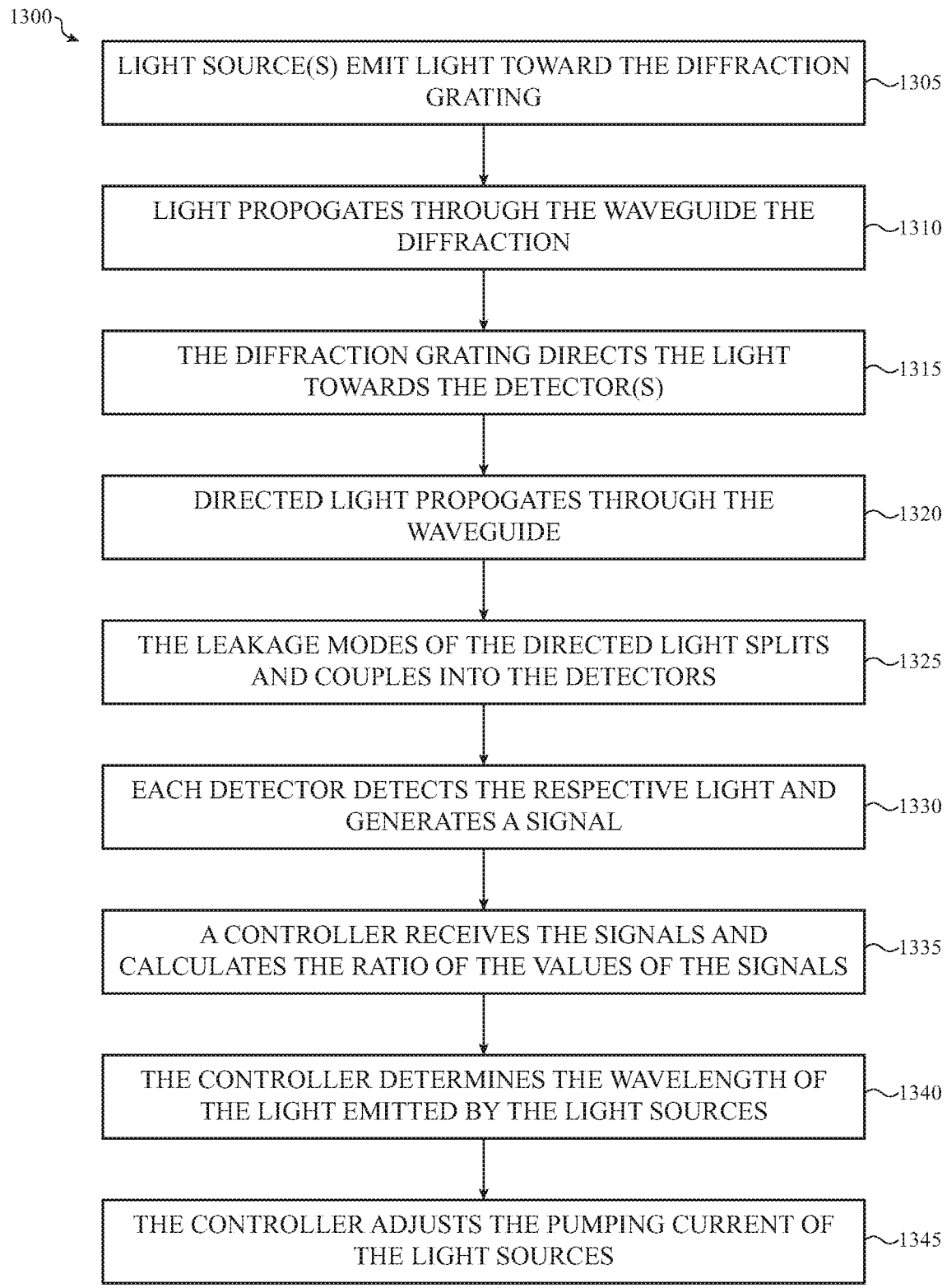
FIG. 13 illustrates a process flow for operating a wavelength stability monitoring system with a diffraction grating.

FIG. 13 illustrates a process flow for operating a wavelength stability monitoring system with a diffraction grating. The operations of process flow 1300 may be applied to the embodiments described with reference to FIGS. 10-12 by including the various optical components, such as the diffraction grating and athermal material planar waveguides in the wavelength stability monitoring device.

At operation 1305 one or more light sources may emit light toward the diffraction grating and the light may propagate along one or more incident light paths and through a planar waveguide and toward the diffraction grating at operation 1310. At operation 1315 the diffraction grating may reflect the light and direct the light toward the one or more detectors and the direct light may propagate through the planar waveguide along one or more output light paths in the planar waveguide at operation 1320.

At operation 1325 leakage modes of the directed light may couple into the detectors. The mode mismatch in the input and output waveguides can lead to a coupling of the leakage mode to one or more of the other output waveguides. The leakage mode may be a light mode that couples out of or leaks out of the output waveguide and which may be received by one or more of the other output waveguides. The light propagating along the one or more output light paths may be incident at a location between the detectors and which may be on or near the Rowland circle. At operation 1330 each detector may detect the respective light and may generate a detector signal. A controller may receive the detector signals and calculate the ratio of the values of the detector signals received by the different detectors at operation 1335. At operation 1340 the controller may determine properties of the light emitted by the light sources, such as the wavelength of light or power. At operation 1345 the controller may adjust the pumping current of the light sources.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings. In the following description of examples, reference is made to the accompanying drawings in which it is shown by way of illustration specific examples that can be practiced. It is to be understood that other examples can be used and structural changes can be made without departing from the scope of the various examples.

Various techniques and process flow operations will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process operations and/or structures have not been described in detail in order to not obscure some of the aspects and/or features described or referenced herein.

Further, although process operations or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

What is claimed is:

1. A wavelength stability monitoring system comprising:
a set of light sources configured to emit light;
a wavelength stability monitor comprising:
a planar waveguide comprising:
a first material; and
a second athermal material different from the first material and located adjacent to the first material and located to receive light from the set of light sources,
a diffraction grating configured to receive light from the planar waveguide;
one or more detectors that receive light from the diffraction grating and generate one or more detector signals indicative of the received light; and
a controller configured to:
provide a control signal to the set of light sources;
receive the one or more detector signals from the one or more detectors;
determine a monitored wavelength based at least in part on the one or more detector signals;
determine a difference between the monitored wavelength and a targeted wavelength; and
adjust the control signals based on the determined difference.

2. The system of claim 1, wherein:
the wavelength stability monitor further comprises:
an input waveguide configured to direct light to the planar waveguide; and
a set of output waveguides configured to receive light from the planar waveguide;
the input waveguide and the output waveguide are strip waveguides;
a first side of the second athermal material is defined by a light path or input light propagating from the input waveguide toward the diffraction grating,
a second side of the second athermal material is defined by a light path or reflected light propagating from the diffraction grating toward the set of output strip waveguides; and
the first material abuts the first side and second side of the second athermal material.

3. The system of claim 2, wherein the second athermal material is not located between the diffraction grating and the one or more detectors.

4. The system of claim 1, wherein:
the first material is located between the diffraction grating and at least one of the one or more detectors; and
the second athermal material is located adjacent to the first material and between the diffraction grating and the at least one of the one or more detectors.

5. The system of claim 1, wherein:
the planar waveguide further comprises a third material located adjacent to the second athermal material; and
the first material and the third material are the same material.

6. The system of claim 5, wherein the second region of the second athermal material is located between the first region and the third region of the first material.

7. The system of claim 1, wherein:
the first material is crystalline silicon; and
the second athermal material is amorphous silicon.

8. An optical device, comprising:
a planar waveguide comprising:
a first material, and
a second athermal material different than the first material and adjacent to the first material, the planar waveguide defining:
an input light path; and
an output light path;
an input waveguide configured to direct light into the planar waveguide, the light propagating on the input light path;
a diffraction grating configured to reflect light received from the planar waveguide to propagate on the output light path;
a first output waveguide configured to receive the reflected light from the planar waveguide and reflected from the diffraction grating; and
a second output waveguide configured to receive the reflected light from the diffraction grating; wherein
the input waveguide, the first output waveguide, and the second output waveguide are located on a Rowland circle.

9. The optical device of claim 8, wherein:
the input light path passes through the first material and the second athermal material;
the optical device further comprises:
a set of optical taps configured to:
receive the light from the one or more light sources,
direct a first portion of the light to the input waveguide, and
direct a second portion of the light toward a sample; and
a set of detectors configured to receive light from the first output waveguide and the second output waveguide, wherein:
the first material and the second athermal material cooperate to define at least part of the output light path;
the output light path is located between the first output waveguide and the second output waveguide on the Rowland circle;
the first output waveguide and the second output waveguide receive light from leakage modes of light on the output light path; and
the output light path directs light to the sample.

10. The optical device of claim 8, wherein the diffraction grating is configured to reflect light to a location on the Rowland circle between the first output waveguide and the second output waveguide.

11. The optical device of claim 10, wherein the first output waveguide and the second output waveguide receive light from leakage modes of light reflected from the diffraction grating.

12. The optical device of claim 11, wherein the light reflected from the diffraction grating corresponds to a first grating order of the diffraction grating.

13. The optical device of claim 12, further comprising:
a first detector configured to receive light corresponding to a second grating order of the diffraction grating; and
a second detector configured to receive light corresponding to a third grating order of the diffraction grating.

14. The optical device of claim 8, further comprising;
one or more light sources optically coupled to the input waveguide; and
one or more detectors optically coupled to at least one of the first output waveguide or the second output waveguide, wherein:
the one or more light sources and the one or more detectors are located on the Rowland circle;
the second athermal material is located such that the input light path passes through the second athermal material; and
the second athermal material is located such that the output light path does not pass through the second athermal material.

15. A method for monitoring wavelengths in an optical sensing system, the method comprising:
transmitting one or more control signals to one or more light sources;
emitting light from the one or more light sources through one or more input waveguides and along one or more input light paths, wherein the emitted light is based on the one or more control signals;
directing a first portion of light to a sample;
directing a second portion of light to a planar waveguide, wherein the second portion of light propagates through the planar waveguide along one or more output light paths, the planar waveguide comprising:
a first material, and
a second athermal material that is adjacent to the first material and different than the first material;
reflecting the second portion of light from a diffraction grating and through the planar waveguide;
receiving the light from the planar waveguide, via one or more output waveguides, at one or more detectors;
generating, by the one or more detectors, one or more detector signals indicative of the light received by the one or more detectors;
determining a monitored wavelength from the one or more detector signals;
determining a difference between the monitored wavelength and a target wavelength; and
generating one or more adjusted control signals based on the difference between the monitored wavelength and the target wavelength; wherein:
the emitted light is based on the one or more control signals; and
the second portion of light propagates through the planar waveguide along one or more output light paths.

16. The method of claim 15, wherein the operation of receiving the light from the planar waveguide, via the one or more output waveguides, using the one or more detectors comprises optically coupling some of the light from the planar waveguide to a first detector and a second detector of the one or more detectors.

17. The method of claim 16, wherein the operation of receiving the light from the planar waveguide, via the one or more output waveguides, using the one or more detectors comprises receiving the light from the planar waveguide at one of the one or more output waveguides that is positioned on a Rowland circle and located between a first detector and a second detector of the one or more detectors.

18. The method of claim 17, wherein the operation of receiving the light from the planar waveguide at one of the one or more output waveguides comprises receiving a mode of light by the first detector and the second detector, wherein the mode of light is leaked from the one of the one or more output waveguides that is located between the first detector and the second detector.

19. The method of claim 15, wherein the operation of receiving the light from the planar waveguide comprises:
receiving first detected light using a first detector, the first detected light corresponding to a first grating order of the diffraction grating; and
receiving second detected light using a second detector, the second detected light corresponding to a second grating order of the diffraction grating.

20. The method of claim 15, wherein a ratio is used to determine a size and a location of the second athermal material, the ratio being:
a total length of the input and output light paths that pass through the first material divided by a total length of the input and output light paths that pass through the second athermal material.

* * * * *